US011252470B2

(12) United States Patent
Nelson et al.

(10) Patent No.: US 11,252,470 B2
(45) Date of Patent: *Feb. 15, 2022

(54) METHODS AND APPARATUS TO MEASURE AUDIENCE COMPOSITION AND RECRUIT AUDIENCE MEASUREMENT PANELISTS

(71) Applicant: The Nielsen Company (US), LLC, New York, NY (US)

(72) Inventors: Daniel Nelson, Tampa, FL (US); Madhusudhan Reddy Alla, Allen, TX (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/007,785

(22) Filed: Aug. 31, 2020

(65) Prior Publication Data
US 2020/0396503 A1 Dec. 17, 2020

Related U.S. Application Data

(60) Continuation of application No. 16/502,480, filed on Jul. 3, 2019, now Pat. No. 10,785,534, which is a
(Continued)

(51) Int. Cl.
*H04N 21/442* (2011.01)
*H04N 21/435* (2011.01)
(Continued)

(52) U.S. Cl.
CPC ..... *H04N 21/44213* (2013.01); *G06K 7/1095* (2013.01); *G06K 19/06037* (2013.01);
(Continued)

(58) Field of Classification Search
CPC ........... H04N 21/44213; H04N 21/237; H04N 21/4126; H04N 21/4223; H04N 21/4756;
(Continued)

(56) References Cited

U.S. PATENT DOCUMENTS 3,885,217 A 5/1975 Cintron
4,547,804 A 10/1985 Greenberg
(Continued)

FOREIGN PATENT DOCUMENTS

EP 0195639 9/1986
EP 0382996 8/1990
(Continued)

OTHER PUBLICATIONS

United States Patent and Trademark Office, "Non-Final Office Action," issued in connection with U.S. Appl. No. 15/343,772, dated Jul. 7, 2017, 13 pages.
(Continued)

*Primary Examiner* — John R Schnurr
(74) *Attorney, Agent, or Firm* — Hanley, Flight & Zimmerman, LLC

(57) ABSTRACT

Methods and apparatus to measure audience composition and recruit audience measurement panelists are disclosed. An example media device disclosed herein includes means for analyzing a video stream of media being presented by the media device, the means for analyzing to detect a first code embedded in the video stream, the first code referencing first audience measurement data to identify the media. The method further includes means for modifying a media output to: after detection of the first code, provide a request for an audience member to join an audience measurement panel; and, after receipt of a response to the request, cause the media device to present a second code, the second code including information that, when the second code is scanned with a portable device other than the media device, is to direct the portable device to a website to provide additional audience measurement data.

29 Claims, 13 Drawing Sheets

Related U.S. Application Data division of application No. 15/907,981, filed on Feb. 28, 2018, now Pat. No. 10,356,470, which is a continuation of application No. 15/343,772, filed on Nov. 4, 2016, now Pat. No. 9,936,249.

(51) Int. Cl.

| | |
|---|---|
| *H04N 21/258* | (2011.01) |
| *H04N 21/858* | (2011.01) |
| *G06K 19/06* | (2006.01) |
| *G06K 7/10* | (2006.01) |
| *G06Q 30/02* | (2012.01) |
| *H04N 21/237* | (2011.01) |
| *H04N 21/41* | (2011.01) |
| *H04N 21/4223* | (2011.01) |
| *H04N 21/475* | (2011.01) |
| *H04N 21/658* | (2011.01) |

(52) U.S. Cl.
CPC ....... *G06Q 30/0201* (2013.01); *H04N 21/237* (2013.01); *H04N 21/25883* (2013.01); *H04N 21/4126* (2013.01); *H04N 21/4223* (2013.01); *H04N 21/435* (2013.01); *H04N 21/4756* (2013.01); *H04N 21/6582* (2013.01); *H04N 21/8586* (2013.01)

(58) Field of Classification Search
CPC ............. H04N 21/6582; H04N 21/435; H04N 21/25883; H04N 21/8586; G06K 19/06037; G06K 7/1095; G06Q 30/0201
See application file for complete search history.

(56) References Cited

U.S. PATENT DOCUMENTS

| | | | |
|---|---|---|---|
| 4,885,632 A | 12/1989 | Mabey et al. |
| 5,425,100 A | 6/1995 | Thomas et al. |
| 8,495,682 B2 | 7/2013 | Dierks et al. |
| 8,768,713 B2 | 7/2014 | Chaoui et al. |
| 8,874,924 B2 | 10/2014 | McMillan |
| 8,930,701 B2 | 1/2015 | Burbank et al. |
| 9,185,462 B2 | 11/2015 | Das et al. |
| 9,301,019 B1 | 3/2016 | Arini et al. |
| 9,510,049 B2 | 11/2016 | Zimmerman |
| 9,848,239 B2 | 12/2017 | Pecjak et al. |
| 9,936,249 B1 | 4/2018 | Nelson et al. |
| 10,785,534 B2 | 9/2020 | Nelson et al. |
| 2007/0011040 A1 | 1/2007 | Wright et al. |
| 2007/0038516 A1 | 2/2007 | Apple et al. |
| 2007/0294132 A1 | 12/2007 | Zhang et al. |
| 2012/0023516 A1 | 1/2012 | Wolinsky et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0278377 A1 | 11/2012 | Weissman et al. |
| 2014/0129841 A1 | 5/2014 | McMillan |
| 2014/0149577 A1 | 5/2014 | Monighetti |
| 2014/0155022 A1 | 6/2014 | Kandregula |
| 2014/0189724 A1 | 7/2014 | Harkness et al. |
| 2014/0259032 A1 | 9/2014 | Zimmerman |
| 2014/0266719 A1 | 9/2014 | Dunn et al. |
| 2015/0012840 A1 | 1/2015 | Maldari et al. |
| 2015/0365714 A1 | 12/2015 | Gildfind et al. |
| 2016/0119672 A1 | 4/2016 | Alonso et al. |
| 2016/0165277 A1 | 6/2016 | Kirillov et al. |
| 2016/0239571 A1 | 8/2016 | Rowe et al. |
| 2018/0192124 A1 | 7/2018 | Nelson et al. |

FOREIGN PATENT DOCUMENTS

| | | |
|---|---|---|
| EP | 0593202 | 4/1994 |
| FR | 2718917 | 10/1995 |
| WO | 8606239 | 10/1986 |

OTHER PUBLICATIONS

United States Patent and Trademark Office, "Notice of Allowance," issued in connection with U.S. Appl. No. 15/343,772, dated Nov. 8, 2017, 8 pages.

United States Patent and Trademark Office, "Supplemental notice of Allowability," issued in connection with U.S. Appl. No. 15/343,772, dated Mar. 7, 2018, 5 pages.

United States Patent and Trademark Office, "Notice of Allowance," issued in connection with U.S. Appl. No. 15/907,981, dated Mar. 4, 2019, 8 pages.

United States Patent and Trademark Office, "Non-Final Office Action," issued in connection with U.S. Appl. No. 15/907,981, dated Nov. 5, 2018, 7 pages.

United States Patent and Trademark Office, "Restriction Requirement," issued in connection with U.S. Appl. No. 15/907,981, dated Aug. 10, 2018, 6 pages.

United States Patent and Trademark Office, "Notice of Allowance," issued in connection with U.S. Appl. No. 16/502,480, dated May 20, 2020, 16 pages.

METHODS AND APPARATUS TO MEASURE AUDIENCE COMPOSITION AND RECRUIT AUDIENCE MEASUREMENT PANELISTS

RELATED APPLICATIONS

This patent arises from a continuation of U.S. patent application Ser. No. 16/502,480 (now U.S. Pat. No. 10,785,534) filed on Jul. 3, 2019, which is a divisional of U.S. patent application Ser. No. 15/907,981 (now U.S. Pat. No. 10,356,470) filed on Feb. 28, 2018, which is a continuation of U.S. patent application Ser. No. 15/343,772 (now U.S. Pat. No. 9,936,249) filed on Nov. 4, 2016. U.S. patent application Ser. No. 16/502,480, U.S. patent application Ser. No. 15/907,981, and U.S. patent application Ser. No. 15/343,772 are hereby incorporated herein by reference in their entireties. Priority to U.S. patent application Ser. No. 16/502,480, U.S. patent application Ser. No. 15/907,981, and U.S. patent application Ser. No. 15/343,772 is claimed.

FIELD OF THE DISCLOSURE

This disclosure relates generally to audience measurement, and, more particularly, to methods and apparatus to measure audience composition and recruit audience measurement panelists.

BACKGROUND

For years, televisions and/or set-top boxes connected to televisions have received media through various media providers including over the air broadcast providers, cable television service providers, and/or satellite television service providers. More recently, media for television has been available over the Internet through the rise of smart televisions (TVs) and/or external devices connected to traditional televisions (e.g., advanced set-top boxes, digital media players, gaming consoles, etc.). The processing power of smart TVs and/or external devices provide the availability of expanded functionality to televisions while also enabling access to a broader array of media content beyond traditional media broadcasting.

DETAILED DESCRIPTION

Figure 1:
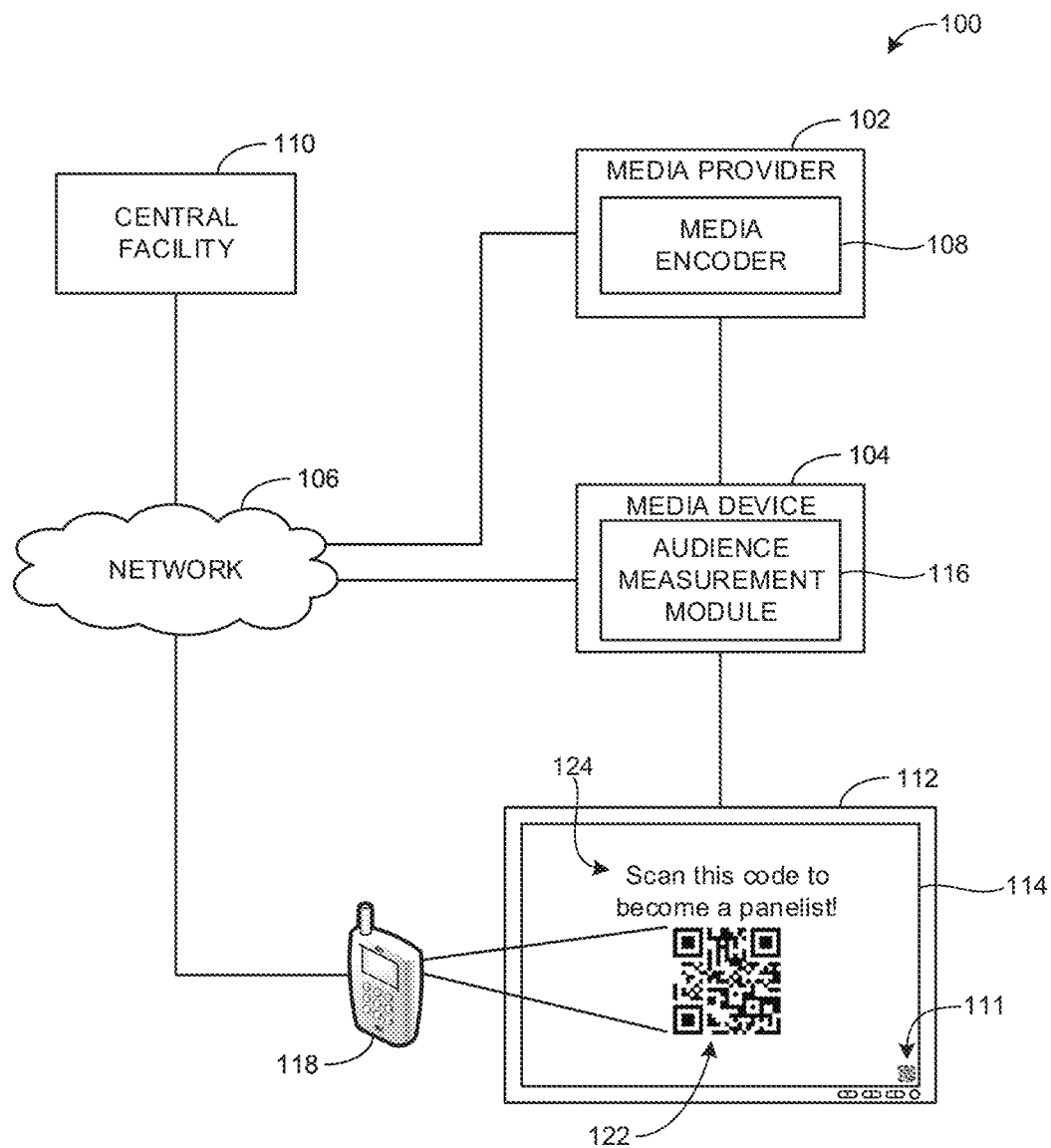
FIG. 1 is a block diagram of an example system in which the teachings of this disclosure may be implemented.

Some techniques to measure audience composition of media include the tracking of individuals (e.g., potential audience members) that have agreed to participate as panelists in a research study maintained by a ratings entity or an audience measurement entity (e.g., The Nielsen Company (US), LLC). Traditionally, audience measurement entities determine demographic reach for advertising and media programming based on registered panel members. That is, an audience measurement entity enrolls people that consent to being monitored into a panel. In some examples, the panelists correspond to a statistically selected subset of all potential audience members that are representative of the whole population of interest. In some such panel-based monitoring systems, the panelists agree to provide detailed demographic information about themselves. In this manner, detailed exposure metrics are generated based on collected metadata of media and associated user demographics, which can then be statistically extrapolated to an entire population of interest (e.g., a local market, a national market, a demographic segment, etc.).

A person may become an audience measurement panelist by enrolling via, for example, a user interface presented on a media presentation device of the person (e.g., via a website). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.).

Media exposure of panelists is monitored by collecting metadata associated with the media to which the panelists are exposed and transmitting such metadata to a central facility of the audience measurement entity for subsequent analysis and processing. In some examples, the media is identified and/or the metadata associated with the media is collected based on watermarks embedded within the media. Watermarking refers to techniques used to identify media such as television broadcasts, radio broadcasts, advertisements (television and/or radio), downloaded media, streaming media, prepackaged media, etc. Existing watermarking techniques identify media by embedding codes (e.g., a watermark), such as media identifying information and/or an identifier that may be mapped to media identifying information, into an audio and/or video component having a signal characteristic sufficient to substantially hide the watermark. As used herein, the terms "code" or "watermark" are used interchangeably and are defined to mean any identification information (e.g., an identifier) that may be transmitted with, inserted and/or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and compared to reference watermarks and/or other metadata that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are hereby defined herein to mean "a proxy that may be used for identifying media by comparison with a reference database and that is generated from one or more inherent characteristics of the media."

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature.

Many media presentation devices and/or associated external devices (e.g., set-top boxes, gaming consoles, digital media players, etc.) do not have sufficient processing power to identify traditional audio watermarks embedded into media and/or to extract signatures from the media to identify the media and/or to collect metadata. Accordingly, audience measurement panelists are often provided with meters provided by an audience measurement entity to fulfill this functionality and enable the reporting of such audience measurement data (e.g., metadata) to a central facility of the audience measurement entity.

Identifying and recruiting individuals to serve as panelists and providing, establishing, and maintaining media monitoring equipment to enable the proper tracking of such individuals can be costly and time consuming. Accordingly, example methods, apparatus, systems, and articles of manufacture disclosed herein may be used to directly measure television audiences across large populations (e.g. census-wide measurements) independent of an audience measurement panel. Furthermore, examples disclosed herein may be used to facilitate the recruitment of viewers from a large (e.g., census-wide) population to join an audience measurement panel to collect more robust audience measurement data that includes detailed demographics about the viewers that become panelists without the need for providing specialized equipment to be installed in the panelists' homes.

Some disclosed examples involve media providers embedding a video-based code into the media rather than (or in addition to) an audio watermark. In some examples, the embedded video code is a barcode with the relevant audience measurement data encoded therein. That is, in some examples, a media provider encodes a barcode with media identifying information and a timestamp. Once encoded, the barcode is embedded into the media to which the barcode is associated. In some example, the barcode is embedded at periodic intervals within the media. The use of a barcode is advantageous because barcodes are widely used and can be decoded with relatively little processing power. As a result, such bar codes can be decoded at an audience member's home without using specialized equipment at least in some examples. While some examples may embed barcodes into the media, the embedded codes may be any other type of visual-based code (e.g., a bit stream) that can be readily detected and processed at a media presentation site (e.g., an audience member's home).

By embedding an easily detected code into media to be distributed by a media provider, the code can be transmitted to every media device that is tuned to receive the media. In accordance with the teachings disclosed herein, at least some media devices that receive the media signal may include an integrated decoder or audience measurement module that detects and decodes the codes embedded in the media. The audience measurement module may be embedded into the media device at the time of manufacturing the media device. As a result, when people purchase such devices and set them up in their homes, the devices are already equipped with the ability to detect and decode the codes embedded into media signals received by such devices. Additionally or alternatively, the audience measurement module may be integrated into pre-existing media devices through a software update to subsequently enable such devices to detect and decode the codes embedded in the media.

In response to detecting a code embedded in media, the audience measurement module embedded in the media device may automatically generate a report to an audience measurement entity indicating the embedded code was detected. The report may include the embedded code and/or the audience measurement data (e.g., metadata) represented by the code (e.g., media identifying information and a timestamp). By receiving such reports from each media device equipped with the audience measurement module, an audience measurement entity may directly determine the total number of media devices (that include the audience measurement module) that were tuned to receive a particular media signal containing a particular code embedded therein. As the audience measurement module is integrated into more media devices (based on new models purchased by consumers or from software updates to previously purchased devices), the audience measurement entity will have access to audience measurement data for a very large population (e.g., potentially millions of households across the United States) without having to extrapolate from feedback collected from a relatively small pool of statistically selected audience measurement panelists.

Some media providers may not embed video-based codes into media distributed to media devices. In such situations, an audience measurement module included within a media device will not be able to detect an embedded code. When an audience measurement module cannot detect a code embedded in media being received by a media device, examples disclosed herein involve the audience measurement module sampling a portion of the media stream to generate a fingerprint or signature that is transmitted to an audience measurement entity for comparison to reference media signatures. In some examples, if the audience measurement entity identifies a match between the sampled media and a reference media signature, a report is generated identifying the media associated with the reference signature as being presented via the media device from which the media sample was obtained. In this manner, the audience measurement entity may determine the number of media devices tuned to particular media even when the media does not include embedded codes as described above. In some examples, a sample of the media may collected and included in a report along with audience measurement data referenced by a code embedded in the media.

Audience measurement data obtained in the disclosed examples has a granularity corresponding to each media device associated with the audience measurement module. That is, while a report of a detected code embedded in media (or a report matching a media sample to a reference signature) may identify that a particular media device is tuned to the particular media, there is no indication of how many individual people are exposed to the media being presented via the media device. Furthermore, there is no indication of the demographics of the people exposed to the media. As such, while examples disclosed herein enable a potentially census-wide measurement of an audience at the device level, audience measurement panels are still helpful in obtaining more detailed and robust demographic data about the composition of an audience at the individual person level.

Accordingly, in some examples, the codes embedded in the media are used to trigger the audience measurement module to provide a prompt, for display to viewers of the media, requesting additional audience measurement data. For example, the prompt may request a viewer to identify (e.g., via remote control of the media device) the number of individual people viewing the particular media presentation device presenting the media containing the detected code. Additionally or alternatively, in some examples, detection of the embedded code may trigger the audience measurement module to provide a redirecting barcode for display via the media device to redirect a viewer of the media to a second screen device to provide the requested information. In some examples, while the code embedded in the media may be sized and/or placed in a manner to not be perceptible to a human viewer, the redirecting barcode provided by the audience measurement module can be visible to people viewing the media. In particular, the barcode presented by the audience measurement module may appear on the screen and remain on the screen for a sufficient period of time to enable a viewer to scan the barcode with a separate portable device (e.g., a second screen device) with barcode scanning capabilities. In some examples, the barcode would direct an Internet browser on the second screen device to a website where the viewer could provide additional audience measurement data (e.g., the number of audience members viewing the media with the viewer, demographics information, etc.) and/or enable the audience member to join a panel.

Examples disclosed herein enable the census-wide delivery of requests for additional audience measurement data to expand upon what may automatically be reported in response to detecting and decoding an embedded code as described above. While it is unlikely that all audience members will respond to requests for additional information, the wide automatic distribution of such requests is likely to result in responses from many individuals that can be used to further improve audience composition metrics.

In some examples, requests for additional audience measurement data are provided in connection with requests for a viewer of the media to become a panelist of an audience measurement panel. In some such examples, the redirecting barcode, displayed for the viewer to scan with a portable device, directs the portable device scanning the barcode to a website that provides information about becoming a panelist and/or an online form to complete the enrollment process.

FIG. 1 is a block diagram of an example system 100 in which the teachings of this disclosure may be implemented. The example system 100 of FIG. 1 monitors media provided by an example media provider 102 for presentation via an example media device 104. The example media provider 102 of the illustrated example of FIG. 1 represents any of one or more entities capable of providing any type of media for presentation via a media device 104 through any available distribution means. The media provider 102 may be a traditional television media provider (e.g., an over the air broadcast provider, a cable television service provider, and/or a satellite television service provider). Additionally or alternatively, the media provider 102 may be a provider of other types of media (e.g., a streaming media service provider, an IPTV provider, etc.). The media provider 102 may deliver the media to the media device 104 via an over-the-air broadcast, via a cable television system, via a direct broadcast satellite system, and/or via a network 106 (e.g., the Internet).

In the illustrated example, the media provider 102 has been provided with a media encoder 108 from an audience measurement entity. In some examples, the media provider 102 implements a media encoder 108 to embed codes into media prior to broadcasting or otherwise distributing the media to the media device 104. The codes may be audio watermarks that are detected by equipment provided to audience measurement panelists for reporting to a central facility 110 of an audience measurement entity. Additionally or alternatively, in some examples, the codes may be visual-based codes embedded into the video stream of a media signal transmitted to the media device 104 tuned to receive such transmissions. In some examples, the embedded code may be a linear barcode or a two-dimensional barcode (e.g., a quick response (QR) code). In the illustrated example of FIG. 1, the code embedded in the media is represented by the small two-dimensional barcode identified by reference number 111. In other examples, the embedded code may take any other suitable form (e.g., a bit stream embedded into one or more pixels of the media signal). In some examples, the code 111 may be substantially imperceptible to a human viewer of the media. For example, the code 111 may be encoded in a portion of the video stream of the signal that is not displayed on screen (e.g., similar to closed captions encoded into line 21 of the vertical blanking interval). In some examples, the code 111 may be embedded within a visible portion of the video stream but limited to a single video frame so that a human viewer is unlikely to notice the brief period when the embedded code is displayed. Furthermore, the code 111 may be relatively small (e.g., less than 20 pixels wide) and placed in a relatively inconspicuous location (e.g., near the corner of a display as shown in FIG. 1). In some examples, the size and/or placement of the code 111 varies depending upon the nature and/or format of the distribution of the media signal.

In some examples, the code 111 includes media identifying information corresponding to the media being provided (e.g., a station ID for the media broadcast signal and/or information uniquely identifying the media content being transmitted (e.g., a television series name, a season and episode number, a movie title, a year of release, etc.)). Further, in some examples, the code 111 may be encoded with a timestamp indicating when the media containing the code 111 was transmitted. In some examples, the code 111 may be embedded within the media on a periodic or aperiodic basis (e.g., every 2 second, every 10 seconds, etc.) with the timestamp information being updated for each successive code. In some such examples, each successive code 111 may be slightly different because each code 111 includes different timestamp information.

The example media device 104 of FIG. 1 is a computing device that is capable of presenting media provided by the media provider 102. In the illustrated example of FIG. 1, the media device 104 presents the media via separate media presentation device 112 that includes a screen 114. That is, in the illustrated example, the media device 104 is an external device associated with the media presentation device 112. In some such examples, the media presentation device 112 and the media device 104 are typical consumer electronics devices. For example, the media presentation device 112 may be a traditional television set while the media device 104 may be a set-top box, a video game console (e.g., an Xbox®, a PlayStation®, etc.), or a digital media player (e.g., a Roku® media player, a Slingbox®, a Tivo®, etc.).

In other examples, the media device 104 is capable of directly presenting media (e.g., via a screen incorporated into the media device 104). That is, the media device 104 and the media presentation device 112 may correspond to the same device. For example, the media device 104 may be a smart television, a television with a built in digital media player, a tablet computer (e.g., an iPad®), a laptop computer, a desktop computer, an Internet enabled mobile handset (e.g., a smartphone, an iPod®, etc.), and/or any other computing device capable of implementing an audience measurement module 116 and displaying media via an integrated screen 114. Thus, as used herein "media devices" may or may not be able to present media without assistance from a second device.

In the illustrated example, the audience measurement module 116 receives and processes the media distributed by the media provider 102 prior to presenting the media via the screen 114 of the media presentation device 112. More particularly, in some examples, the audience measurement module 116 monitors the media to detect and decode the visual-based codes (e.g., the code 111) embedded therein. The detection and/or decoding of traditional audio watermarks embedded in media may rely on significant processing demands met by specialized equipment provided to audience measurement panelists. By contrast, detecting and decoding visual-based codes, such as the barcode 111, is relatively simple so that many existing media devices would have sufficient processing capacity to do so. As a result, virtually any media device 104 (e.g., a smart TV, a set-top box, a gaming console, a digital media player, etc.) has the potential to include an example audience measurement module 116 as disclosed herein. Inasmuch as the code 111 is embedded into media prior to distribution to the media device 104, the code 111 may be detected by every media device 104 tuned to receive the media and includes an audience measurement module 116. That is, in some examples, census-wide delivery and detection of codes embedded within media may be possible in accordance with the teachings disclosed herein.

In some examples, the audience measurement module 116 is incorporated into the media device 104 at the time of manufacture of the device before it is purchased by an end user. In other examples, the audience measurement module 116 may be incorporated into the media device 104 through a software update after an end user has purchased and/or used the media device 104. In this manner, the audience measurement module 116 may be implemented in media devices 104 owned by a very large number of individuals to make the census-wide (or near-census-wide) tracking of media possible. For example, more than 30 million households in the United States are estimated to have a smart TV that could include the audience measurement module 116 with potentially millions more with traditional television sets that are connected to an external media device (e.g., a set-top box, a gaming console, a digital media player, etc.) that could include the audience measurement module 116. As the integration of the Internet and television increases, it is likely that these numbers will increase even further. Furthermore, millions of other computing devices (e.g., tablets, laptop computers, smartphones, etc.) may also serve as the media device 104 with the audience measurement module 116.

In some examples, the audience measurement module 116 may communicate with the central facility 110 of the audience measurement entity through the network 106. More particularly, in response to detecting a code 111 embedded in a particular media signal, the audience measurement module 116 may automatically generate and transmit a report to the central facility 110 indicating the embedded code 111 was detected. The report may include the embedded code 111 and/or the information encoded within the embedded code 111 (e.g., media identifying information and a timestamp indicating the time the media was transmitted by the media provider 102). Additionally or alternatively, the report may include additional information such as, for example, a second timestamp indicating the time when the media was presented via the screen 114. Further, the report may include device identifying information (e.g., a serial number) to uniquely identify the particular media device 104 implementing the audience measurement module 116 that detected the embedded code 111. Further still, the report may include location information based on the Internet Protocol (IP) address of the audience measurement module 116 transmitting the report.

By receiving such reports from each media device 104 equipped with the audience measurement module 116, the central facility 110 may directly determine the total number of media devices 104 (that include the audience measurement module 116) that were tuned to receive a particular media signal containing a particular code 111. With the potential for the audience measurement module 116 being integrated into a large number of media devices 104 (based on new models purchased by consumers or from software updates to previously purchased devices), the audience measurement entity will have access to audience measurement data for a potentially very large population (e.g., potentially millions of households across the United States) without having to extrapolate from feedback collected from a limited pool of statistically selected audience measurement panelists provided using costly media monitoring equipment.

While the audience measurement data collected by the central facility 110 from audience measurement modules 116 responding to a detected code 111 embedded in a media signal may be based on a very large or census-type population, the granularity of such data corresponds to each media device 104 associated with the audience measurement module 116. That is, while a report may identify that a particular media device 104 is tuned to particular media, there may be no indication of how many individual people are exposed to the media being played via the particular media device 104. Furthermore, there may be no indication of the demographics of the people exposed to the media.

Accordingly, in some examples, the embedded codes 111 are further used to facilitate the collection of additional audience measurement data specific to individual audience members. More particularly, in some examples, detection of the embedded code 111 may trigger the audience measurement module 116 to modify the presentation of the media on the screen 114 to provide a prompt requesting a viewer of the media presentation device 112 to identify the number of individual people viewing the media containing the code 111 being presented at the media presentation device 112. The prompt may additionally and/or alternatively request additional information about the viewers. A user response by the viewer may be included in the report sent to the central facility 110. The audience measurement module 116 may modify the presentation of the media to present the prompt in any suitable manner. For example, the prompt may visually replace some or all of the media, the prompt may visually overlie the media, or the prompt may be included in a sidebar or information panel that is spaced apart from where the media is being displayed. The prompt may include a visual component, an audible component, or both.

In some examples, the viewer may respond to the prompt by entering a user response via a remote control associated with the media device 104. Additionally or alternatively, the prompt provided by the audience measurement module 116 may direct viewers to a website maintained by the audience measurement entity to provide the requested information. In some examples, in response to detecting a code 111 embedded in the media, the prompt generated by the audience measurement module 116 includes a redirecting barcode 122. That is, in some examples, the display of the redirecting barcode 122 is triggered by the detection of the embedded code 111 such that they would not appear on the screen 114 at the same time. However, both are shown together in FIG. 1 for purposes of explanation.

In the illustrated example, the redirecting barcode 122 is encoded with information (e.g., a uniform resource locator (URL)) to redirect a viewer to a website after scanning the barcode 122 with a portable device 118 of the viewer. More particularly, the redirecting barcode 122 may be a linear barcode or a two-dimensional barcode (e.g., a QR code) that is recognizable by a scanning application on the portable device 118 to automatically open up a browser on the portable device 118 at the website. In this manner, relatively little content is displayed on the screen 114 to disturb an audience member attempting to view the media in which the embedded code 111 was detected because the audience member is redirected to the website on a second screen device (e.g., the portable device 118). Furthermore, redirecting an audience member to a website on a second screen device in this manner enables the audience member to determine when to provide the additional information requested. For example, rather than having to respond immediately to the request during the media presentation a viewer is watching, the viewer may scan the barcode 122 and then continue watching the media to return to the website on the portable device 118 at a later point in time to provide the requested information.

Unlike the code 111 embedded into the media by the media provider 102 that may not be perceptible to a human viewer, in the illustrated example, the redirecting barcode 122 provided by the audience measurement module 116 is visible to people viewing the screen 114. In particular, as described above, the embedded code may be in a single video frame and have a relatively small size that is in an inconspicuous location. By contrast, the redirecting barcode 122 may appear on the screen and remain on the screen for a sufficient period of time to enable a person to scan the redirecting barcode 122 with the portable device 118. Thus, as represented in the illustrated example of FIG. 1, the embedded code 111 is relatively small and located in the corner of the screen 114 while the redirecting barcode 122 is much larger and placed in a more conspicuous location. While the redirecting barcode 122 is shown on the center of the screen 114 and consuming a substantial portion of the display, in some examples, the barcode 122 may be placed in a different location (e.g., in an information sidebar) and be of any suitable size to enable scanning by the portable device 118. In some examples, the redirecting barcode 122 is displayed along with a text prompt 124 explaining the purpose of the barcode 122. In some examples, each viewer of the screen 114 may be invited and/or encouraged to scan the redirecting barcode 122 individually to separately access the website and provide additional information requested by the audience measurement entity.

In some examples, the redirecting barcode 122 displayed for viewer scanning is based on information contained in the code 111 embedded into the media signal by the media provider 102. For example, the code 111 may include the uniform resource locator (URL) corresponding to the website to which a portable device is directed upon scanning the redirecting barcode 122. In some examples, the embedded code 111 is a barcode that is the same as the redirecting barcode 122. That is, in some examples, the redirecting barcode 122 is a copy or duplication of the embedded code 111 to simplify the procedure and reduce the processing requirements for the audience measurement module 116 in generating the redirecting barcode 122. In other examples, the redirecting barcode 122 may be a static barcode that is stored in a memory of the audience measurement module 116 and retrieved in response to detecting the embedded code 111 regardless of the particular content of the embedded code 111.

Potentially millions of media devices having an audience measurement module 116 to detect the embedded code 111 in media and providing a redirecting barcode 122, as described above, enable the nearly census-wide delivery of requests for audience member counts, demographics, and/or any other audience measurement data beyond the device-level information that may automatically be reported upon detecting the code 111. While not all audience members may respond to such requests, the wide automatic distribution of such requests is likely to result in responses from many individuals that can be used to further improve audience composition metrics.

In some examples, the redirecting barcode 122 is provided as part of a request to recruit audience members as formal panelists in an audience measurement panel. That is, in some examples, rather than, or in addition to, using the census-wide delivery of the embedded code 111 to trigger a request for audience information specific to the particular media in which the code 111 was embedded, the code 111 may trigger requests for viewers of the media to enroll as panelists who agree to have their media viewing behavior tracked over time and associated with the demographic information they provide. Whether the requested information is limited to a particular media presentation or geared towards recruiting new panelist members, in some examples, the process may be the same except that the website to which the portable device 118 is directed is different. For example, when seeking panelists, the website may request more detailed information and/or provide more detail regarding the nature of being a panelist (e.g., describing the expectations and/or any incentives offers for enrollment) than when requesting the number of audience members and/or basic demographic details of the viewers of particular media.

In some examples, the media consumption behavior of people who agree to join an audience measurement panelist by completing an enrollment procedure via a website to which they were directed upon scanning the redirecting barcode 122 is based on the subsequent reporting of detected codes 111 embedded in the media by the audience measurement module 116. That is, after detailed demographic information has been collected from a person consenting to be a panelist, a new report is transmitted to the central facility 110 in response the audience measurement module 116 detecting a new code 111 embedded in the media signal (e.g., every 2 seconds, every 10 seconds, etc.), the report is associated with the panelist and the collected demographic information for the panelist. In such examples, the collected information may not be sufficient to determine how many individuals are viewing media via the media device 104 at any particular time. However, the collected demographic information may provide some indication of the number of individuals living in the household associated with the media device 104 and/or the general viewing habits of each household individual to at least obtain a more detailed picture of who may be viewing the media at any given point in time. Furthermore, in some examples, the enrollment process for a panelist may include a request for the panelist to periodically supplement the data collected in response to the detected codes with additional information about the media consumption habits of the panelist.

Other more traditional audience measurement panels often include individuals that have been provided with specialized equipment to track their media consumption behavior, count the number of audience members at any given point in time, and/or obtain more precise and/or detailed information. While the illustrated example may not enable the collection of as precise and detailed information, the illustrated example can be expanded to much larger populations than is feasible for a more traditional panel that implements more robust audience measurement techniques. Indeed, obtaining and tracking panelists in accordance with the example of FIG. 1 can be accomplished by maintaining a website to which audience members may be directed if interested in becoming panelists, and maintaining servers at the central facility 110 to receive the reports transmitted by the audience measurement module 116 in response to detected codes embedded in media. Furthermore, the census-wide delivery of recruitment requests enables the ability to quickly and cost-effectively acquire panelists of potentially very large populations. Further still, in some examples, panelists identified in this manner may be subsequently identified to become panelists in the more robust panels described above.

In addition to the audience measurement module 116 transmitting reports to the central facility 110, in some examples, the central facility 110 may transmit instructions and/or commands to the audience measurement module 116. For example, the central facility 110 may provide instructions to the audience measurement module 116 defining when the audience measurement module 116 is to provide a prompt to an audience member in response to detecting an embedded code 111. That is, while the code 111 serves as the trigger to generate a prompt (e.g., to request more information and/or to invite a viewer to become an audience member panelist), in some examples, instructions from the central facility 110 of the audience measurement entity may suppress such actions by the audience measurement module 116. For example, once a person responds to a recruitment request and enrolls as a panelist, there may be no need to continue inviting that person to become a panelist. Accordingly, in some such examples, the central facility 110 may instruct the audience measurement module 116 to stop generating prompts on the screen 114 when a new code 111 is detected in a media stream being presented on the screen 114.

Figure 2:
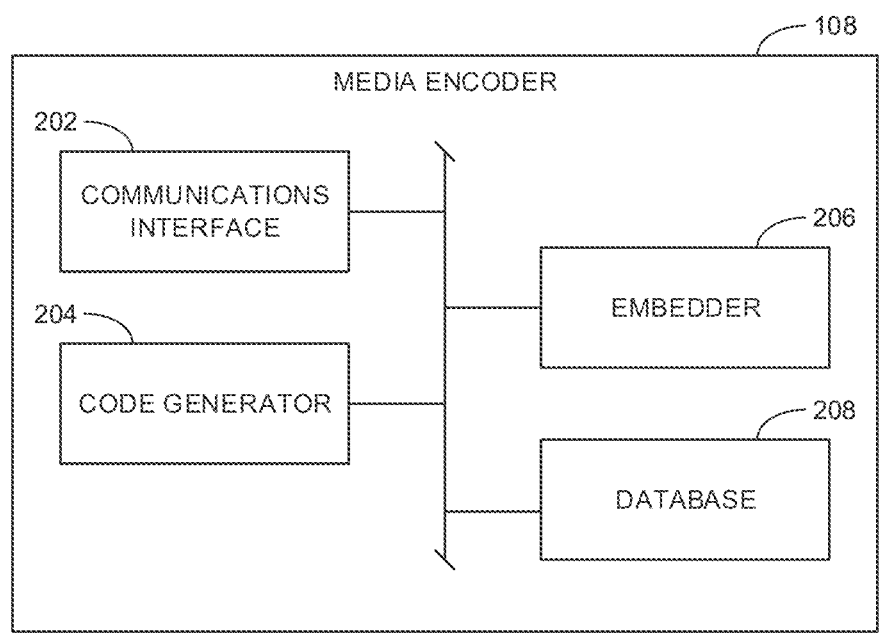
FIG. 2 is a block diagram of an example implementation of the example media encoder of FIG. 1.

FIG. 2 is a block diagram of an example implementation of the example media encoder 108 of FIG. 1. The example media encoder 108 includes an example communications interface 202, an example code generator 204, an example embedder 206, and an example database 208. The example communications interface 202, which may be implemented by a modem or other communication device, serves to communicate with one or more of the audience measurement module 116 of the media device 104, or the central facility 110. In some examples, the communications interface 202 serves to receive media to be modified by the media encoder 108 and/or data to be used in modifying the media. In some examples, the data used to modify the media includes media identifying information provided by the central facility 110 and incorporated into codes embedded into the media (e.g., the code 111). Such data may be stored in the database 208. Additionally, the communications interface 202 serves to transmit the modified media for distribution to audience members for consumption.

In the illustrated example, the media encoder 108 includes the example code generator 204 to generate a code (e.g., the code 111 of FIG. 1) with relevant information to be embedded into the media. In some examples, the information represented in the code 111 includes a timestamp corresponding to when the media is transmitted for distribution to audience members. In some examples, the information represented in the code 111 includes media identifying information to identify the media into which the code 111 is to be embedded. In some examples, the media identifying information includes a source of the media (e.g., a station ID for the media broadcast signal) that can be used in conjunction with the timestamp to determine the particular media presentation containing the code 111 by looking up a programming schedule or lineup of media from the identified source at the identified time. Additionally or alternatively, in some examples, the media identifying information includes information uniquely identifying the media presentation being transmitted such as, for example, a television series name, a season and episode number, a movie title, a year of release, etc. In some examples, the media identifying information is a media content ID that may be used to look up such information in a database.

The example code generator 204 may encode additional information into the code 111, as appropriate. In some examples, the code 111 may include a URL corresponding to a website through which people may provide audience measurement data (e.g., people counts, demographics, etc.) and/or enroll as audience measurement panelists. In this manner, the embedded code 111 may provide the information to be used by an audience measurement module 116 of a media device 104 to generate a redirecting barcode 122 for a viewer to scan and access the website. In some examples, the embedded code 111 is a barcode that is the same as the redirecting barcode 122. That is, in some examples, the embedded code 111 may be duplicated by the audience measurement module 116 for display via a screen 114 as the redirecting barcode 122 for a viewer to scan without any additional processing on the part of the audience measurement module 116 beyond detecting the embedded code 111.

In the illustrated example of FIG. 2, the media encoder 108 is provided with the example embedder 206 to embed the code 111 generated by the code generator 204 into a media signal. In some examples, the embedder 206 analyzes the media to determine a size and/or placement of the code 111 in the video stream of the media. In some examples, the size and/or placement of the code 111 may fixed to a particular region and/or one of a plurality of fixed regions. The size and/or placement may be based on having the code 111 be as inconspicuous and/or unnoticeable as possible. For example, the code may be placed near a corner of the display of the media and have a relatively small size (e.g., less than 20 pixels wide).

Further, in some examples, the embedder 206 determines the timing for embedding the code 111 into the media to reduce the noticeability of the code 111 to a human viewer. For example, the embedder 206 may embed the code 111 within a single frame of the video stream so that the code 111 would only flash for a short period of time corresponding to the frame rate of the media. That is, the code 111 may not be embedded in adjacent video frames immediately before and after the video frame containing the barcode. However, the code 111 may be embedded in multiple frames of the video stream spaced apart at intervals (e.g., every two seconds, every ten seconds, etc.). In some such examples, successive codes 111 may be slightly different because different codes 111 include different timestamp information. In some examples, the embedder 206 may vary the interval between any two successive codes 111 depending on the content of the media. For example, the embedder 206 may analyze the media to identify particular frames in which the designated area for the code 111 includes an appearance that would make the code 111 less noticeable to a viewer (e.g., when the area is multi-colored and/or characterized by pixels with varying intensities).

While an example manner of implementing the media encoder 108 of FIG. 1 is illustrated in FIG. 2, one or more of the elements, processes and/or devices illustrated in FIG. 2 may be combined, divided, re-arranged, omitted, eliminated and/or implemented in any other way. Further, the example communications interface 202, the example code generator 204, the example embedder 206, the example database 208, and/or, more generally, the example media encoder 108 of FIG. 2 may be implemented by hardware, software, firmware and/or any combination of hardware, software and/or example communications interface 202, the example code generator 204, the example embedder 206, the example database 208 firmware. Thus, for example, any of the example communications interface 202, the example code generator 204, the example embedder 206, the example database 208, and/or, more generally, the example media encoder 108 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 202, the example code generator 204, the example embedder 206, and/or the example database 208 is/are hereby expressly defined to include a tangible computer readable storage device or storage disk such as a memory, a digital versatile disk (DVD), a compact disk (CD), a Blu-ray disk, etc. storing the software and/or firmware. Further still, the example media encoder 108 of FIG. 1 may include one or more elements, processes and/or devices in addition to, or instead of, those illustrated in FIG. 2, and/or may include more than one of any or all of the illustrated elements, processes and devices. For example, the media encoder 108 may additional include functionality to encode audio watermarks and/or any other types of metadata used for audience measurement purposes into the media before distribution to audience members.

Figure 3:
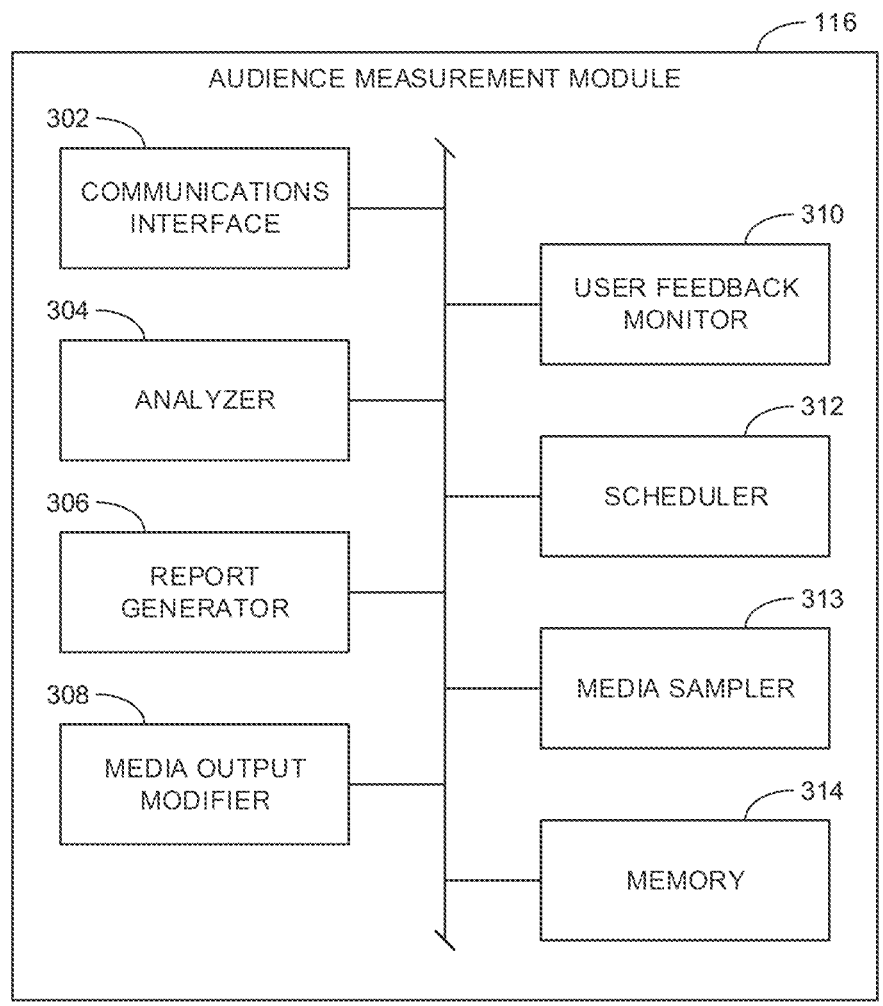
FIG. 3 is a block diagram of an example implementation of the example audience measurement module of FIG. 1.

FIG. 3 is a block diagram of an example implementation of the example audience measurement module 116 of FIG. 1. The example audience measurement module 116 includes an example communications interface 302, an example analyzer 304, an example report generator 306, an example media output modifier 308, an example user feedback monitor 310, an example scheduler 312, an example media sampler 313, and an example memory 314. The example communications interface 302, which may be implemented by a modem or other communication device, serves to communicate with one or more of the media provider 102, or the central facility 110. In some examples, the communications interface 202 serves to receive media distributed by the media provider 102 to which the media device 104 is tuned. As described above, in the illustrated example, the media received by the communications interface 302 includes one or more embedded codes 111 into the media with encoded media identifying information, a timestamp, and/or other relevant information. Further, the example communications interface 302 enables communications with the central facility 110 of an audience measurement entity via the network 106.

In the illustrated example of FIG. 3, the audience measurement module 116 is provided with the example analyzer 304 to analyze a media signal received via the communications interface 302 to detect and decode a code 111 embedded in the media. In some examples, where the size and placement of the code 111 is fixed, the analyzer 304 specifically monitors the fixed area where the embedded code 111 is to appear. Where the size and/or placement of the embedded code 111 may vary, the analyzer 304 may analyze each video frame in its entirety to detect the embedded code 111. Once the example analyzer 304 detects an embedded code 111, the analyzer 304 decodes the code to extract the information represented by the code.

In some examples, the report generator 306 uses the information decoded from the embedded code 111 to generate a report to be transmitted to the central facility 110. In some examples, the report may include the embedded code 111 to be decoded at the central facility 110. In some examples, the report may include the information decoded from the embedded code 111 and arranged in a different format. The report may also include device identifying information to identify the media device 104 containing the audience measurement module 116 from which the report was sent. For example, the device identifying information may include a serial number of the media device 104. By including device identifying information in the report, the central facility 110 may associate different reports transmitted at different times (e.g., in response to different codes) when they are received from the same media device 104. Additionally or alternatively, the report may include an IP address associated with the media device 104 that may be used to determine a general location of the media device 104. In some examples, the IP address may be used as the device identifying information to uniquely identify the media device 104.

In some examples, the report is automatically generated by the report generator 306 and transmitted each time the analyzer 304 detects an embedded code 111. In other examples, the report generator 306 may generate a report associated with multiple codes 111 detected by the analyzer 304 over a period of time. In some such examples, the report may be transmitted after a threshold number of codes have been detected, after a threshold period of time has elapsed since last transmitting a report, and/or after the size of the report exceeds a threshold size in the memory 314.

In the illustrated example of FIG. 3, the audience measurement module 116 is provided with the media output modifier 308 to modify an output or display of the media via the screen 114 of the media presentation device 112. In some examples, the media output modifier 308 modifies the output to include a prompt to viewers of the media presentation device 112 to take some form of action. In some examples, the prompt is a request for the viewers to provide additional audience measurement data beyond what is available from decoding the embedded code 111. For example, the prompt may request viewers to specify the number of individual audience members viewing the media via the particular media device 104 and/or to provide additional information about such viewers (e.g., demographic information (gender, age, etc.)). Additionally or alternatively, in some examples, the prompt may request the viewers to enroll and/or inquire about their willingness to enroll as panelists in an audience measurement panel. In some examples, viewers may provide user feedback to the prompts via a remote control of the media device 104.

In some examples, the media output modifier 308 modifies the display of the media to include a redirecting barcode 122 provided on the screen 114 for the viewers to scan with a portable device 118. In some examples, the redirecting barcode 122 includes a URL to automatically direct a browser of the portable device 118 to a website set up to receive additional audience measurement data as requested in the prompts described above. Redirecting viewers to a website enables the viewers to provide feedback without the need for the viewers to awkwardly enter their feedback using a remote control that may not be designed to easily provide such information. That is, the website may facilitate the collection of additional and/or more detailed information than what may be practical when using a remote control directly. Further, redirecting a viewer to a website on a second screen device reduces the amount of time prompts and/or other information is taking up space on the screen 114 of the primary device where the media is being presented. Further still, redirecting a viewer to a website on a second screen device enables the viewer to delay providing the requested information if, for example, the viewer does not want to be distracted at the moment while viewing the media.

In some examples, the redirecting barcode 122 presented for scanning is the same as the embedded code 111 detected in the media signal that triggered the display of the redirecting barcode 122. In some examples, the redirecting barcode 122 may be different than the embedded code 111 but based on content in the embedded code 111. In some examples, the redirecting barcode 122 is stored in the memory 314 and contains content that is fixed and independent of the content of the embedded code 111 in the media signal.

In the illustrated example of FIG. 3, the audience measurement module 116 is provided with the user feedback monitor 310 to detect user responses to displayed prompts and to initiate any subsequent action based on the user response. For example, if the prompt requests a viewer to specify, via the remote control, the number of individual audience members presently viewing the media presented via the media device 112, the user feedback monitor 310 may detect the number specified and provide such to the report generator 306 to include in a report to be transmitted to the central facility 110.

As another example, if the prompt inquires whether a viewer would be interested in becoming an audience measurement panelist, the user feedback monitor 310 may detect when the viewer provides a user response indicating an interest in becoming a panelist (e.g., by pressing an OK button on the remote control in response to the prompt) and then instruct the media output modifier 308 to provide a redirecting barcode 122 for the viewer to scan to access more information about the enrollment process and/or to complete the enrollment process. Thus, in some examples, the redirecting barcode 122 is presented after the user feedback monitor 310 identifies a user response to a previously provided prompt indicating an interest of the viewer in becoming a panelist. In some examples, the redirecting barcode 122 may be presented automatically in response to the analyzer 304 detecting an embedded code 111 in the media. In some such examples, the redirecting barcode 122 may be presented along with an explanation of the purpose of the barcode 122 to the viewer as shown by the prompt 124 in FIG. 1.

In the illustrated example of FIG. 3, the audience measurement module 116 is provided with example scheduler 312 to schedule or coordinate when the media output modifier 308 is to modify the display of the media to include a prompt and/or a redirecting barcode 122 to redirect a second screen device to a designated website. While such prompts may be triggered upon the analyzer 304 detecting an embedded code 111 in the media, it may be desirable to limit how often such prompts art actually provided. For instances, while codes 111 may be embedded into the media at intervals of approximately every two seconds, prompting a viewer to provide additional information and/or to becoming a panelist at the same frequency would likely annoy the viewer. Accordingly, in some examples, the scheduler 312 suppresses the display of prompts in response to detected codes 111 embedded in media according to a specified schedule. In some examples, the schedule may define a threshold period of time between successive displays of a prompt and/or a redirecting barcode 122 for scanning. The threshold period of time may be corresponding to one a week, one a month, or any other suitable time frame. In some examples, the schedule and/or rules defining the schedule are stored in the memory 314. In some examples, the schedule is defined based on user response data collected by the user feedback monitor 310. For example, the threshold period of time after initially displaying a prompt and/or a redirecting barcode 122 may be longer if the viewer provided a user response positively declining to provide additional information or enroll as a panelist (e.g., selecting a "No thanks" option via a remote control) than if the viewer merely ignored the prompt without positively responding.

Further, if the viewer agrees to enroll as a panelist, the scheduler 312 may suppress subsequent prompts for the viewer to become a panelist indefinitely and/or for a threshold period of time needed to confirm whether the viewer completed the enrollment process. In some examples, confirmation of enrollment may be provided by the viewer via subsequent inputs via a remote control of the media device 104. For example, after enrolling as a panelist, the audience measurement entity may provide information to the panelist (e.g., via email and/or any other means) that may be entered into the settings of the audience measurement module 116 to cause the scheduler 312 to suppress future invitations to become a panelist. In some examples, confirmation of a viewer enrolling as an audience measurement panelist may be provided to the audience measurement module 116 directly from the central facility 110 of the audience measurement entity without the subsequent involvement of the new panelist.

Additionally or alternatively, the scheduler 312 may define the timing for providing prompts to viewers based on other input received from the central facility 110. For example, the audience measurement entity may desire a greater number of panelists in a particular geographic region. Therefore, the central facility 110 may provide instructions to the scheduler 312 of audience measurement modules 116 having IP addresses in the region of interest to increase the frequency that recruitment request prompts are provided to viewers of the associated media devices 104. In some examples, input from the central facility 110 may define all times when prompts are to be provided to viewers. That is, in some examples, the scheduler 312 may suppress the display of such prompts unless instructed otherwise by the central facility 110.

In some examples, the analyzer 304 may not detect a code 111 embedded in to the media. This may be because the media provider 102 does not have a media encoder 108 to embed such codes and/or because the media provider 102 otherwise determines not to embed a code 111 in the media. In some examples, when the analyzer 304 fails to detect an embedded code 111, the media sampler 313 collects a sample of the media that may be used to identify the media. That is, in some examples, the media sampler 313 collects a segment of the media that is to be used as a media signature to uniquely identify the media. The media sample may be audio based, video based, or both audio and video based. In some examples, the media sampler 313 samples specific portions of the media likely to include media identifying information. For example, the media sampler 313 may focus on a corner of the video stream of the media where it is likely that a station logo or other identifying information may be displayed. Other portions of the video and/or audio stream of the media may be collected by the media sampler 313.

In some examples, the report generator 306 may generate a report to be transmitted to the central facility 110 that includes the media sample collected by the media sampler 313. Such reports may also include additional information such as device identifying information, IP address information, a timestamp, and/or any other suitable information that would to enable the central facility 110 to identify the media sampled by the media sampler 313 and associate the media was the media device 104 containing the audience measurement module 116 that generated the report. In some examples, the media sampler 313 may collect a media sample from the media in addition to the analyzer 304 detecting a code 111 embedded in the media. In some such examples, both the code 111 (or audience measurement data reference by the code 111) and the media sample may be included in a report generated by the report generator 306.

While an example manner of implementing the audience measurement module 116 of FIG. 1 is illustrated in FIG. 3, one or more of the elements, processes and/or devices illustrated in FIG. 3 may be combined, divided, re-arranged, omitted, eliminated and/or implemented in any other way. Further, the example communications interface 302, the example analyzer 304, the example report generator 306, the example media output modifier 308, the example user feedback monitor 310, the example scheduler 312, the example media sampler 313, the example memory 314, and/or, more generally, the example audience measurement module 116 of FIG. 3 may be implemented by hardware, software, firmware and/or any combination of hardware, software and/or firmware. Thus, for example, any of the example communications interface 302, the example analyzer 304, the example report generator 306, the example media output modifier 308, the example user feedback monitor 310, the example scheduler 312, the example media sampler 313, the example memory 314, and/or, more generally, the example audience measurement module 116 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 302, the example analyzer 304, the example report generator 306, the example media output modifier 308, the example user feedback monitor 310, the example scheduler 312, the example media sampler 313, and/or the example memory 314 is/are hereby expressly defined to include a tangible computer readable storage device or storage disk such as a memory, a digital versatile disk (DVD), a compact disk (CD), a Blu-ray disk, etc. storing the software and/or firmware. Further still, the example audience measurement module 116 of FIG. 1 may include one or more elements, processes and/or devices in addition to, or instead of, those illustrated in FIG. 3, and/or may include more than one of any or all of the illustrated elements, processes and devices.

Figure 4:
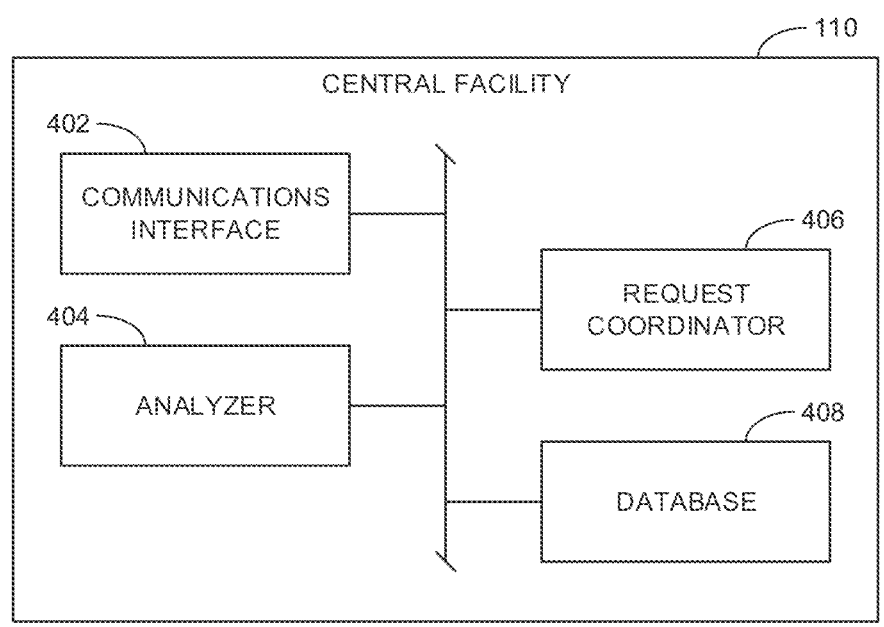
FIG. 4 is a block diagram of an example implementation of the example central facility of FIG. 1.

FIG. 4 is a block diagram of an example implementation of the example central facility 110 of FIG. 1. The example central facility includes an example communications interface 402, an example analyzer 404, an example request coordinator 406, and an example database 408. The example communications interface 402, which may be implemented by a modem or other communication device, serves to communicate with one or more of the media provider 102, the audience measurement module 116 of the media device 104, or the portable device 118 via the network 106. In some examples, the central facility 110 provides media identifying information via the communications interface 402 to the media provider 102 for encoding in codes 111 to be embedded in the media provided to end users. In some examples, the central facility 110 may provide the codes 111 previously encoded with relevant information for embedding in media.

In some examples, the communications interface 402 of the central facility 110 receives audience measurement data from the reports generated by the report generator 306 of the audience measurement module 116. In some examples, the received audience measurement data is stored in the example database 408. Additionally, in some examples, the central facility 110 maintains a website used to collect additional audience measurement data (e.g., demographics information) to which the portable devices 118 of media viewers are directed upon scanning barcodes 122 displayed via the media devices 104 as described above. In some examples, the communications interface 402 of the central facility 110 receives such information submitted via the website.

In some examples, the communications interface 302 is used to communicate with third party media device manufacturers and/or media device application developers. More particularly, the example communications interface 302 may provide a software development kit and/or other information needed to embed and/or incorporate the audience measurement module 116 into media devices 104 owned by end users. In some examples, media devices 104 may be manufactured with the audience measurement module 116 already incorporated before sale to end users. In other examples, previously purchased media devices 104 may be updated with software that executes the audience measurement module 116. In some examples, the communications interface 402 provides the audience measurement module 116 directly to an end user for execution on the media device 104.

In the illustrated example of FIG. 4, the central facility 110 is provided with the example analyzer 404 to analyze the collected audience measurement data to determine the size and/or composition of audiences of media and/or generate reports of any other audience measurement metrics. In some examples, the audience measurement data is based on the reports generated by the audience measurement module 116 in response to detecting codes 111 embedded in a media signal. The analyzer 404 may determine the particular media being presented via any particular media device 104 based on the timestamp and/or media identifying information contained in the detected code 111 and included in the report transmitted to the central facility 110. For example, the analyzer 404 may look up a programming schedule (e.g., stored in the example database 408) corresponding to a particular station identifier (SID) extracted from the detected code 111 to determine the particular media presentation being played via the media device 104 at the time indicated in the timestamp included in the embedded code 111. In some examples, where the media identifying information is content specific (e.g., uniquely identifies a particular program), the central facility 110 may look up the corresponding content in a database (e.g., the database 408).

Additionally or alternatively, in some examples, the audience measurement data analyzed by the example analyzer 404 is based on the reports generated by the audience measurement module 116 in response to failing to detect codes 111 embedded in a media signal. That is, in some examples, the analyzer 404 analyzes media samples contained in the reports from the audience measurement module 116 collected by the media sampler 313. The analyzer 404 may determine the particular media being presented via any particular media device 104 by matching the media sample to reference media signatures stored in the database 408. In some examples, the matching signatures may enable the direct identification of the content of the media. In some examples, the matching signatures may be able to identify the source of the media based on the media sample (e.g., via a station logo) that can then be used to uniquely identify the content of the media by looking up the content in a programming schedule for the identified source of media using the timestamp included in the report with the media sample.

In some examples, the reports providing the audience measurement data analyzed by the analyzer 404 may be obtained from a large number (e.g., hundreds of thousands or millions) of media devices 104 implementing the audience measurement module 116, thus, enabling census-type audience measurement. While the audience measurement data contained in such reports may identify the media being presented via each reporting media device 104 for a very large population, there may be little to no information concerning the particular number of individual audience members viewing the media presented via any particular media device 104 and/or the demographics of such audience members. Accordingly, in some examples, the analyzer 404 determines the size and/or composition of an audience for a particular media presentation at a level of granularity corresponding to individual media presentation devices. In some examples, the analyzer 404 uses IP geolocation to determine approximate locations of the reporting media devices 104 to determine an approximate geographic distribution of the audience of a particular media presentation. Furthermore, in some examples, the analyzer 404 may infer certain demographic characteristics of the individuals in the households containing the media devices 104 based on the approximate locations of the media devices 104.

In some examples, the analyzer 404 analyzes additional audience measurement data to determine individual audience member counts and/or demographics of certain audience members based on feedback provided by the audience members responding to requests for the additional information. In some examples, such requests are presented to the audience members via the media device 104 in response to detecting an embedded code 111 in the media. In some examples, viewers may provide user responses to such requests directly via a remote control of the media device 104. In such examples, the additional audience measurement data may be included in the reports transmitted to the central facility 110 by the audience measurement module 116. In other examples, the request for additional information may include presenting a redirecting barcode 122 on the screen 114 where the media is being presented for a viewer to scan with a portable device 118 to be directed to a website through which the additional information may be provided. Thus, in some examples, viewers may provide user responses to requests for additional information indirectly via a website designated in the barcode 122 presented to the viewer.

In some examples, the additional audience measurement data provided by audience members is provided in connection with the audience members enrolling as panelists in an audience measurement panel. That is, in some examples, the request presented via the media device 104 is a request for a viewer to become a panelist and the website to which the viewer is directed enables completion of the enrollment process. In some such examples, the analyzer 404 analyzes the demographic information and/or other details obtained during the panel enrollment process via the website and associates such information with the audience measurement data obtained via the reports transmitted by the audience measurement module 116 of the media device 104. In this manner, the analyzer 404 may determine more particular characteristics of an audience of media. Furthermore, while not all audience members may respond to the requests for additional audience measurement data (e.g., to enroll as a panelist), it is likely that a relatively large population of audience members will still respond to such requests because the requests are being delivered on a census-wide scale (e.g., via every media device 104 containing the audience measurement module 116). For example, it may be that only 2% of audience members are willing to become panelists. However, if over 50 million households own a media device 104 that implements the audience measurement module 116, people in some or all 50 million households may receive requests to join an audience measurement panel resulting in approximately 1 million becoming panelists. Thus, even with a very small percentage of viewers responding to the requests, the analyzer 404 will nevertheless have a large amount of audience measurement data for robust analysis of the size and/or composition of audiences.

In the illustrated example of FIG. 4, the central facility 110 is provided with the example request coordinator 406 to direct or coordinate the delivery of requests for audience members to become panelists of an audience measurement panel. As described above, in some examples, the requests are presented via the media device 104 in response to detecting an embedded code 111 in media being presented via the media device 104. However, it may be undesirable to provide a prompt or request for a viewer to become a panelist as frequently as the codes 111 are detected because it may annoy and frustrate audience members. Accordingly, in some examples, the request coordinator 406 generates instructions that are transmitted to the audience measurement module 116 to define when and/or how often such requests are provided. In some examples, once a person associated with a particular media device 104 has volunteered and enrolled as a panelist, the request coordinator 406 directs the audience measurement module 116 to stop providing future requests for additional audience measurement data. In some examples, the request coordinator 406 may determine the geographic distribution of panelists and identify potential regions that are underrepresented in the panel. In some such examples, the request coordinator 406 may target audience measurement modules 116 located in such regions (determined based on IP geolocation) to increase the pool of panelists in the region by instructing the audience measurement modules 116 to increase the frequency of requests provided to the audience members.

While an example manner of implementing the central facility 110 of FIG. 1 is illustrated in FIG. 4, one or more of the elements, processes and/or devices illustrated in FIG. 4 may be combined, divided, re-arranged, omitted, eliminated and/or implemented in any other way. Further, the example communications interface 402, the example analyzer 404, the example request coordinator 406, the example database 408, and/or, more generally, the example central facility 110 of FIG. 4 may be implemented by hardware, software, firmware and/or any combination of hardware, software and/or firmware. Thus, for example, any of the example communications interface 402, the example analyzer 404, the example request coordinator 406, the example database 408, and/or, more generally, the example audience measurement module 116 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 402, the example analyzer 404, the example request coordinator 406, and/or the example database 408 is/are hereby expressly defined to include a tangible computer readable storage device or storage disk such as a memory, a digital versatile disk (DVD), a compact disk (CD), a Blu-ray disk, etc. storing the software and/or firmware. Further still, the example central facility 110 of FIG. 1 may include one or more elements, processes and/or devices in addition to, or instead of, those illustrated in FIG. 4, and/or may include more than one of any or all of the illustrated elements, processes and devices.

Flowcharts representative of example machine readable instructions for implementing the example media encoder 108 of FIG. 2, the example audience measurement module 116 of FIG. 3, and/or the example central facility 110 of FIG. 4 are shown in FIGS. 5-10. In this example, the machine readable instructions comprise a program for execution by a processor such as the processors 1112, 1212, 1312 shown in the example processor platforms 1100, 1200, 1300 discussed below in connection with FIGS. 11-13. The programs may be embodied in software stored on a tangible computer readable storage medium such as a CD-ROM, a floppy disk, a hard drive, a digital versatile disk (DVD), a Blu-ray disk, or a memory associated with the processors 1112, 1212, 1312, but the entire program and/or parts thereof could alternatively be executed by a device other than the processors 1112, 1212, 1312 and/or embodied in firmware or dedicated hardware. Further, although the example programs are described with reference to the flowchart illustrated in FIGS. 5-10, many other methods of implementing the example media encoder 108, the example audience measurement module 116, and/or the example central facility 110 may alternatively be used. For example, the order of execution of the blocks may be changed, and/or some of the blocks described may be changed, eliminated, or combined.

As mentioned above, the example processes of FIGS. 5-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
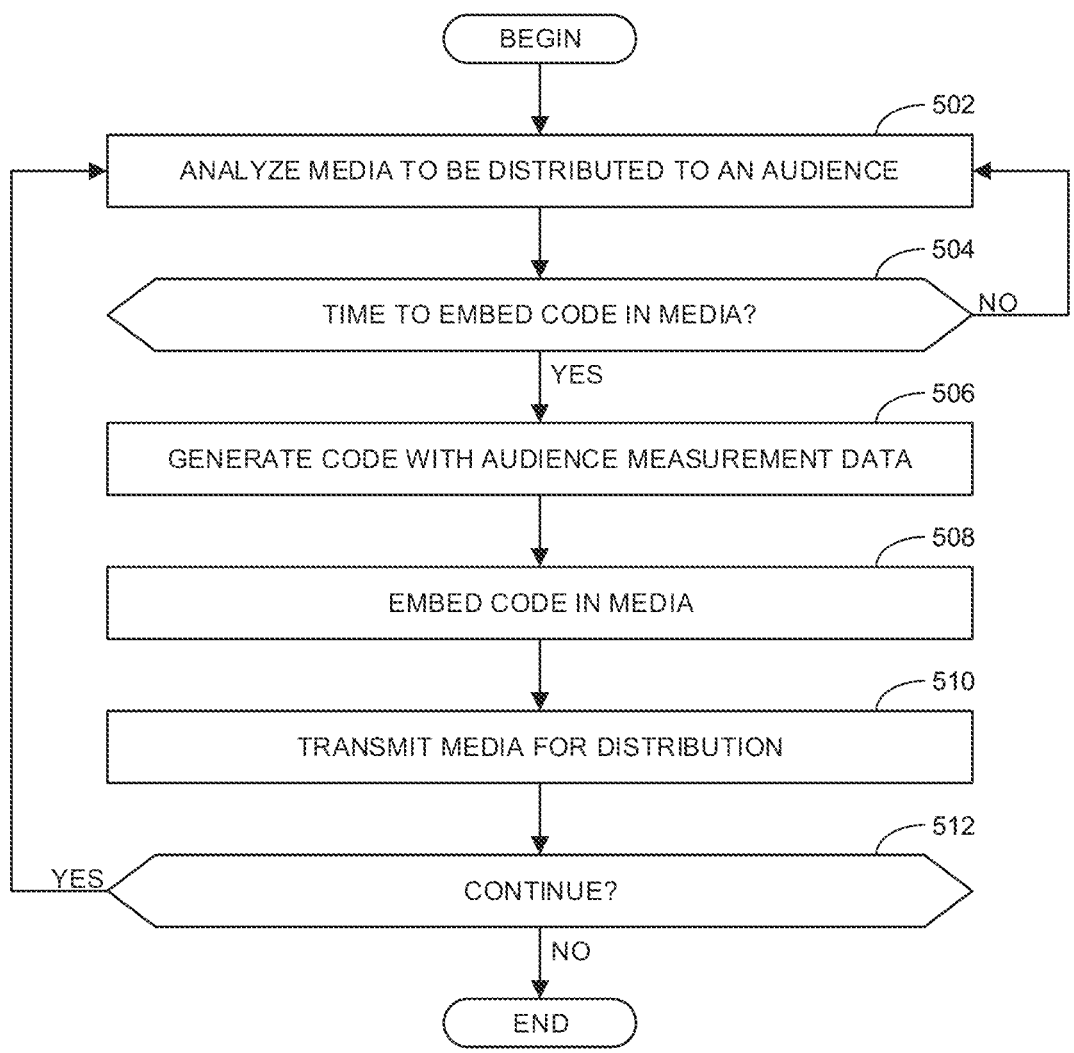
FIG. 5 is a flowchart representative of example machine-readable instructions that may be executed to implement the example media encoder of FIGS. 1 and/or 2.

FIG. 5 is a flowchart representative of example machine-readable instructions that may be executed to implement the example media encoder 108 of FIGS. 1 and/or 2. The example process begins at block 502, where the example embedder 206 analyzes media to be distributed to an audience. In some examples, the embedder 206 analyzes the media to identify the size and/or placement for a code (e.g., the code 111 of FIG. 1) to be embedded into the video stream of the media. In some examples, the code 111 is to be embedded in a fixed region (or one of a plurality of fixed regions) within the video stream. In some such examples, the embedder 206 analyzes the fixed region(s) to determine whether the media content in the fixed region(s) is suitable to embed a code 111 in a manner that is unlikely to be perceived by a human viewer.

At block 504, the example embedder 206 determines whether it is time to embed a code 111 in the media. In some examples, a code 111 is scheduled to be embedded at periodic intervals (e.g., every two seconds). In some examples, the intervals between successive codes may vary depending on the analysis of the media and/or for any other reason. If it is not time to embed a code 111, control returns to block 502. If the embedder 206 determines that it is time to embed a code 111, control advances to block 506 where the example code generator 204 generates a code 111 with audience measurement data. In some examples, the generated code 111 is an encoded barcode. In some examples, the audience measurement data represented in the code 111 includes media identifying information associated with the media stored in the database 208. In some examples, the media identifying information is provided by an audience measurement entity. Further, in some examples, the audience measurement data represented in the code 111 includes a timestamp.

At block 508, the example embedder 206 embeds the code 111 in the media. At block 510, the example communications interface 202 transmits the media for distribution. At block 512, the example media encoder 108 determines whether there is more media. If so, control returns to block 502. Otherwise, the example process of FIG. 5 ends.

Figure 6:
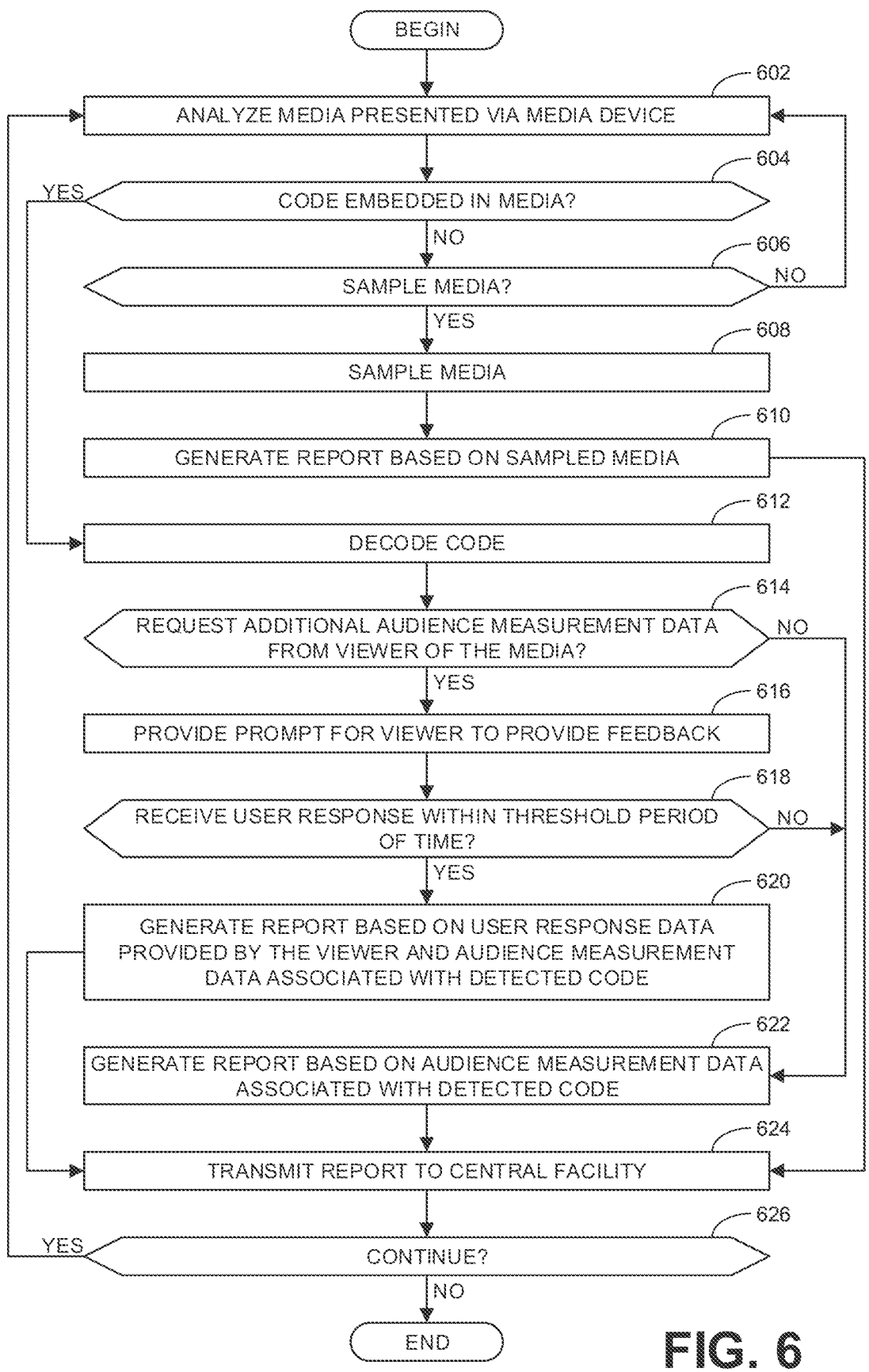
FIGS. 6-8 are flowcharts representative of example machine-readable instructions that may be executed to implement the example audience measurement module of FIGS. 1 and/or 3.
Figure 7:
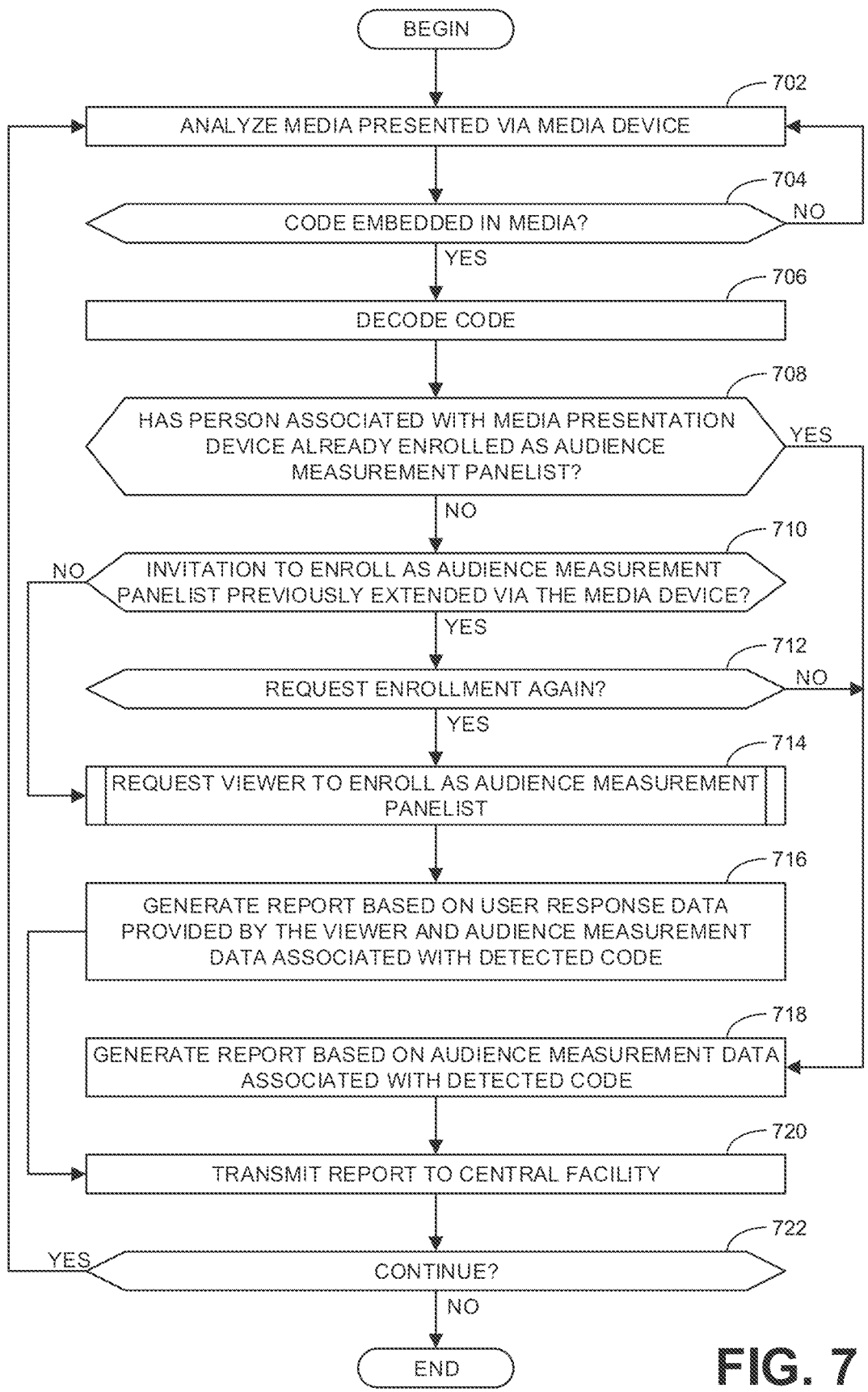
Figure 8:
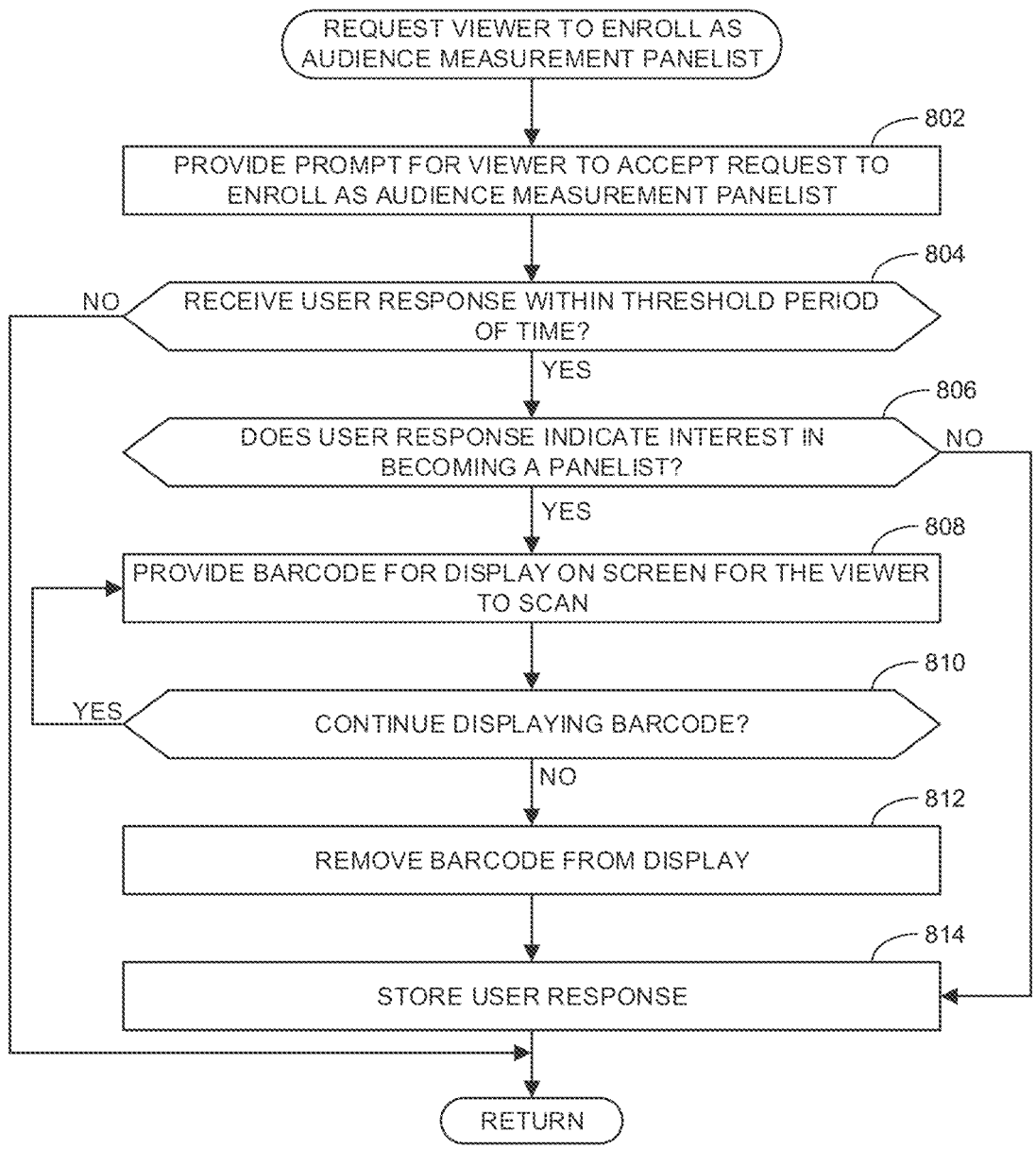

FIGS. 6-8 are flowcharts representative of example machine-readable instructions that may be executed to implement the example audience measurement module 116 of FIGS. 1 and/or 3. The example process of FIG. 6 begins at block 602 where the example analyzer 304 analyzes media presented via the media device 104. At block 604, the example analyzer 304 determines whether a code 111 is embedded in the media. The code 111 may be a barcode, a bit stream, and/or any other type of code encoded into the video stream of the media. If the example analyzer 304 does not detect a code 111 embedded in the media, control advances to block 606 where the example media sampler 313 determines whether to sample the media. In some examples, the media sampler 313 may determine to sample the media if a first threshold period of time (e.g., 1 minute, 5 minutes, 10 minutes, etc.) has elapsed during the presentation of media via the media device 104 during which no embedded code 111 was detected (block 604). Further, in some examples, the media sampler 313 may determine to sample the media only when a second threshold period of time (e.g., 1 minute, 5 minutes, 10 minutes, etc.) has elapsed since a sample of the media was last collected. The first and second threshold periods of time may be coterminous or begin after different times. Further the first and second threshold periods of time may correspond to the same length of time or different lengths of time.

If the example media sampler 313 determines not the sample the media, control returns to block 602. If the example media sampler 313 determines to the sample the media, control advances to block 608 where the example media sampler 313 samples the media. At block 610, the example report generator 306 generates a report based on the sampled media. Thereafter, control advances to block 624 where the example communications interface 302 transmits the report to a central facility 110.

Returning to block 604, if the example analyzer 304 does detect a code 111, control advances to block 612 where the example analyzer 304 decodes the code 111. In some examples, the code 111 contains audience measurement data associated with the media including a timestamp and media identifying information. At block 614, the example scheduler 312 determines whether to request additional audience measurement data from a viewer of the media. If so, control advances to block 616 where the example media output modifier 308 provides a prompt requesting the viewer to provide additional audience measurement data. In some examples, the prompt may request the viewer to specify the number of people viewing the media. In some examples, the prompt may request the viewer to specify other information about the people viewing the media (e.g., gender, age, etc.). In some examples, the prompt includes an explanation as to how the viewer is to respond using a remote control of the media device 104.

While the prompt may request user feedback, the viewer may ignore or fail to notice the prompt. Accordingly, at block 618, the example user feedback monitor 310 determines whether a user response was received within a threshold period of time (e.g., 15 seconds, 30 seconds, 1 minute, etc.). If so, control advances to block 620 where the example report generator 306 generates a report based on the user response data provided by the viewer and the audience measurement data associated with the detected code 111.

Returning to block 614, if the example scheduler 312 determines not to request additional audience measurement data from the viewer, control advances to block 622 where the example report generator 306 generates a report based on the audience measurement data associated with the detected code 111. That is, the report generated at block 622 will not include any additional audience measurement data based on user response data because no request was provided to obtain such information. Similarly, at block 618, if the example user feedback monitor 310 determines that a user response was not received within a threshold period of time, control advances directly to block 622.

Once the report has been generated either including information based on the user response data (block 620) or without information based on a user response (block 622), control advances to block 624 where the example communications interface 302 transmits the report to a central facility 110. At block 626, the example audience measurement module 116 determines whether to continue. If so, control returns to block 602. Otherwise, the example process of FIG. 6 ends.

The example process of FIG. 7 begins at block 702 where the example analyzer 304 analyzes media presented via the media device 104. At block 704, the example analyzer 304 determines whether a code 111 is embedded in the media. If the example analyzer 304 does not detect a code 111 embedded in the media, control returns to block 702. In some examples, if the example analyzer 304 does not detect a code 111 embedded in the media, the media sampler 313 may determine to sample the media to include in a report as discussed above in connection with blocks 606, 608, and 610 of FIG. 6. However, these blocks have been omitted in FIG. 7 for the sake of clarity. If the example analyzer 304 does detect a code 111 (block 704), control advances to block 706 where the example analyzer 304 decodes the code 111. In some examples, the code 111 contains audience measurement data associated with the media including a timestamp and/or media identifying information.

At block 708, the example scheduler 312 determines whether a person associated with the media device 104 has already enrolled as an audience measurement panelist. In some examples, whether a person has already enrolled as a panelist is determined based on information received from an audience measurement entity reporting the enrollment to the audience measurement module 116 via the central facility 110. Additionally or alternatively, enrollment of people as panelists may be confirmed by the people themselves providing user inputs to the audience measurement module 116 of the media device 104. In some examples, the user inputs may be based on instructions provided to the people from the audience measurement entity as part of the enrollment process.

If no person has already enrolled as an audience measurement panelist, control advances to block 710 where the example scheduler 312 determines whether an invitation to enroll as an audience measurement panelist has previously been extended via the media device 104. If so, control advances to block 712 where the example scheduler 312 determines whether to request enrollment again. In some examples, whether to request enrollment again is based on how long it has been since the last time the invitation was extended. In some examples, the duration between subsequent invitations to enroll as a panelist may vary based on whether viewers positively declined a previous invitation or merely did not respond to the invitation. Additionally or alternatively, in some examples, the timing for enrollment requests may be based on instructions received from an audience measurement entity via the central facility 110.

If the example scheduler 312 determines to request enrollment again, control advances to block 714 where the audience measurement module 116 requests a viewer to enroll as an audience measurement panelist. Returning to block 710, if an invitation to enroll has not previously been extended via the media device 104, control advances directly to block 714 to request a viewer to enroll as an audience measurement panelist. Further detail regarding the execution of block 714 is described below in connection with FIG. 8.

At block 716, the example report generator 306 generates a report based on user response data provided by the viewer and the audience measurement data associated with the detected code 111. As described more fully below in connection with FIG. 8, the user response data may include whether the viewer agrees to enroll as a panelist or declines to enroll as a panelist. Such user response data may inform how soon, if ever, the viewer is to be again invited to become a panelist (e.g., the next time the process executes blocks 708, 710, and 712).

Returning to block 708, if the example scheduler 312 determines a person associated with the media device 104 has already enrolled as an audience measurement panelist control advances to block 718. At block 718, the example report generator 306 generates a report based on the audience measurement data associated with the detected code 111. That is, the report generated at block 718 will not include any user response data obtained from the viewer because the viewer will already have provided such information as part of the enrollment process to become a panelist. Similarly, returning to block 712, if the example scheduler 312 determines not to request enrollment again, control advances directly to block 718 to generate a report without user response data because no user response data will have been collected.

Once the report has been generated either including information based on the user response data (block 716) or without information based on a user response data (block 718), control advances to block 720 where the example communications interface 302 transmits the report to a central facility 110. At block 722, the example audience measurement module 116 determines whether to continue. If so, control returns to block 702. Otherwise, the example process of FIG. 7 ends.

FIG. 8 is a flowchart illustrating an example implementation of block 714 of FIG. 7 to request a viewer to enroll as an audience measurement panelist. The example process of FIG. 8 begins at block 802 where the example media output modifier 308 provides a prompt for a viewer to accept a request to enroll as an audience measurement panelist. For example, a text prompt may be displayed on screen that states "Would you be interested in becoming an audience measurement panelist?" along with a direction to select a "YES" option or a "NO THANKS" option with a remote control of the media device 104. Any other suitable language and/or selection options may alternatively be provided for the viewer to consider. For example, the initial prompt may be more direct in getting a commitment from viewers by stating "Will you become an audience measurement panelist?" or less direct by stating "Would you like to learn more about becoming an audience measurement panelist?"

At block 804, the example user feedback monitor 310 determines whether a user response was received within a threshold period of time (e.g., 15 seconds, 30 seconds, 1 minute, etc.). The user response may be that the viewer declines the invitation to becoming a panelist or that the viewer accepts the invitation to become a panelist (or at least to learn more before deciding). In some situations, the viewer may not provide a response because the viewer chooses to ignore the prompt and/or does not notice the prompt.

If the example user feedback monitor 310 determines that a user response was received within the threshold period of time (block 804), control advances to block 806 where the example user feedback monitor 310 determines whether the user response indicates an interest in becoming a panelist. If so, control advances to block 808 where the example media output modifier 308 provides a barcode (e.g., the redirecting barcode 122 of FIG. 1) for display on screen for the viewer to scan. In some examples, the barcode 122 is displayed alongside the prompt previously provided at block 802. In some examples, the barcode 122 replaces the prompt. Additionally or alternatively, the barcode 122 may be provided along with a new text prompt explaining what the viewer is to do (e.g., "Scan this barcode to enroll as a panelist"). In some examples, the barcode 122 is encoded with a URL to direct a portable device 118 of the viewer used to scan the barcode 122 to a website where additional information regarding enrollment as a panelist is provided. In some examples, the website may include an online form to immediately begin collecting demographic information from the viewer to complete the enrollment process. In some examples, the central facility 110 of the audience measurement entity maintains the website and receives the information input by viewers via the website using their portable devices 118.

At block 810, the example media output modifier 308 determines whether to continue displaying the barcode 122. In some examples, this is determined based on whether a threshold period of time has elapsed sufficient to enable a person to scan the barcode 122 (e.g., 30 seconds, 1 minute, etc.). In some examples, a prompt provided with the barcode 122 may include a request to "Press OK once you have scanned the code." In such examples, the barcode 122 will remain displayed until the viewer presses OK on the remote control of the media device 104 regardless of the duration of time. If the example media output modifier 308 determines to continue displaying the barcode 122, control returns to block 808. Otherwise, control advances to block 812 where the example media output modifier 308 removes the barcode 122 from display.

At block 814, the example memory 314 stores the user response. For example, the memory 314 may store whether the viewer agreed to become (or at least indicating an interest in becoming) a panelist or whether the viewer declined the invitation to become a panelist. In some examples, this user response information may be used to determine how soon, if ever, the viewer is to be again invited to become a panelist as discussed above. Further, in some examples, this user response data corresponds to the content included in the report generated at block 716 of FIG. 7 as described above. There is no direct way for the audience measurement module 116 to detect whether a viewer actually scans a displayed barcode 122 and proceeds to complete the enrollment process. Thus, by including the initial indication of interest of a viewer in becoming a panelist in the report to the central facility 110, the central facility may flag the associated audience measurement data and any subsequent data reported by the particular media device 104 to be associated with the particular viewer once the viewer completes the enrollment process.

Returning to block 806, if the example user feedback monitor 310 determines that the user response does not indicate an interest in becoming a panelist (e.g., the viewer declined the request), control advances directly to block 814 to store the user response. Thereafter, the example process of FIG. 8 ends and returns to complete the process of FIG. 7.

Returning to block 804, if the example user feedback monitor 310 determines that a user response was not received within the threshold period of time, the example process of FIG. 8 immediately ends and returns to complete the process of FIG. 7.

In some examples, aspects of the example process of FIGS. 7 and 8 may be incorporated in the example process of FIG. 6. For example, providing a barcode 122 for a viewer to scan may be included in the process of FIG. 6 to obtain the additional audience measurement data via a website without necessarily requesting the viewer to become a panelist. Similarly, aspects of the example process of FIG. 6 may be incorporated in the example process of FIGS. 7 and 8. For example, some information regarding the viewer volunteering to become a panelist may be collected directly by the media device 104 based on inputs entered via a remote control of the media device 104 in addition to or instead of the information obtained via the website.

Figure 9:
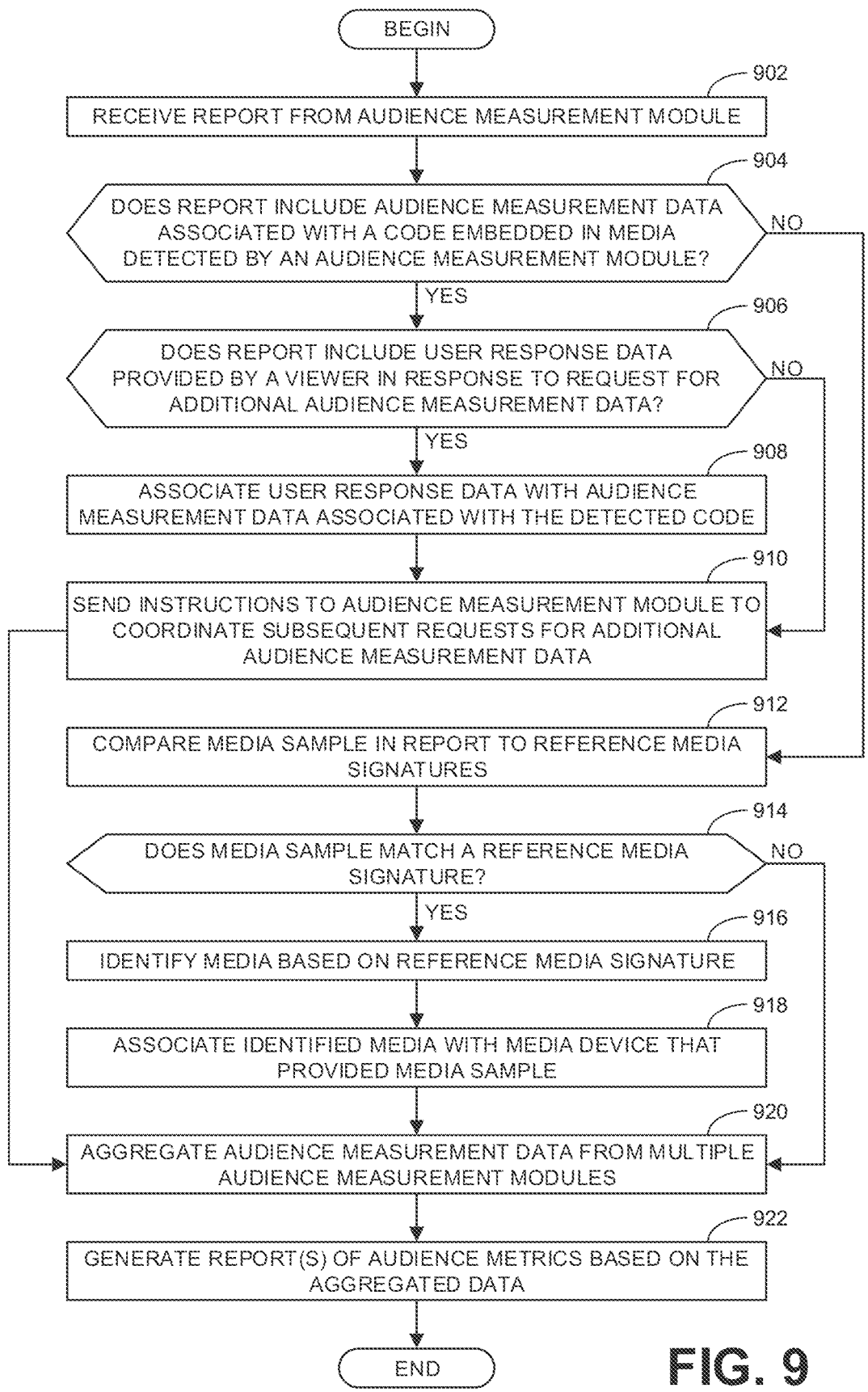
FIGS. 9 and 10 are flowcharts representative of example machine-readable instructions that may be executed to implement the example central facility of FIGS. 1 and/or 4.

FIG. 9 is a flowchart representative of example machine-readable instructions that may be executed to implement the example central facility 110 of FIGS. 1 and/or 4. The example process begins at block 902 where the example communications interface 402 receives a report from an audience measurement module 116. At block 904, the example analyzer 404 determines whether the report includes audience measurement data associated with a code 111 embedded in media detected by the audience measurement module 116. If so, control advances to block 906, the example analyzer 404 determines whether the report includes user response data provided by a viewer in response to additional audience measurement data. The user response data may include an indication of the number of individuals viewing the media presented via the audience measurement module 116 and/or any other relevant information. If the example analyzer 404 determines that the report does include user response data, control advances to block 908. At block 908, the example analyzer 404 associates the user response data with the audience measurement data associated with the detected code before advances to block 910. Returning to block 906, if the example analyzer 404 determines that the report does not include user response data, control advances directly to block 910.

At block 910, the example request coordinator 406 sends instructions to the audience measurement module to coordinate subsequent requests for additional audience measurement data. Thereafter, control advances to block 920 where the example analyzer 404 aggregates the audience measurement data from multiple audience measurement modules 116.

Returning to block 904, if the example analyzer 404 determines that the report does not include an embedded code 111, control advances to block 912 where the example analyzer 404 compares a media sample in the report to reference media signatures. At block 914, the example analyzer 404 determines whether the media sample matches a reference media signature. If so, control advances to block 916 where the example analyzer 404 identifies the media based on the matching reference media signature. At block 918, the example analyzer 404 associates the identified media with the media device 104 that provided the media sample. Thereafter, control advances to block 920 to aggregate the audience measurement data from multiple audience measurement modules 116. Returning to block 914, if the media sample does not match a reference media signature, there is no way for the central facility 110 to identify the media. Accordingly, in such examples, control advances to directly to block 920 to aggregate other audience measurement data obtained from other audience measurement modules. At block 922, the example analyzer 404 generates report(s) of audience metrics based on the aggregated data. Thereafter, the example process of FIG. 9 ends.

Figure 10:
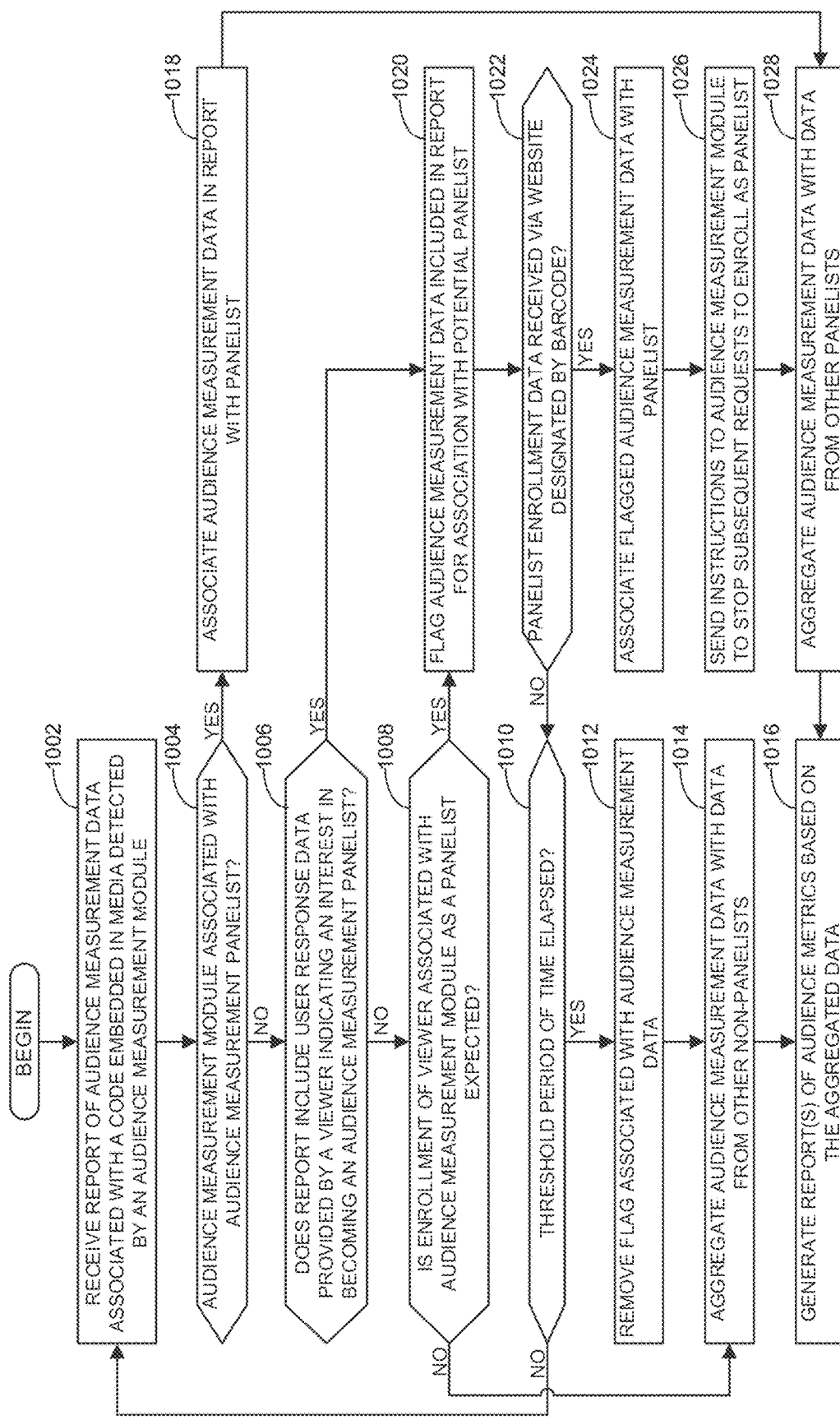

FIG. 10 is a flowchart representative of example machine-readable instructions that may be executed to implement the example central facility 110 of FIGS. 1 and/or 4. The example process begins at block 1002 where the example communications interface 402 receives a report of audience measurement data associated with a code 111 embedded in media detected by an audience measurement module 116. In some examples, the report may not be associated with an embedded code 111 because the media being monitored did not include a code 111. In such examples, the report may include a sample of the media that may be compared to reference media signatures in a similar manner as discussed above in connection with blocks 912, 914, 916, and 918 of FIG. 9. However, these blocks have been omitted in FIG. 10 for the sake of clarity. At block 1004, the example analyzer 404 determines whether the audience measurement module 116 associated with an audience measurement panelist. If so, control advances to block 1018 where the example analyzer 404 associates the audience measurement data in the report with the panelist. Thereafter, control advances to block 1028 where the example analyzer 404 aggregates the audience measurement data with data from other panelists. From there, control advances to block 1016, where the example analyzer generate report(s) of audience metrics based on the aggregated data.

Returning to block 1004, if the example analyzer 404 determines that the audience measurement module 116 is not associated with a panelist, control advances to block 1006. At block 1006, the example analyzer 404 determines whether the report includes user response data provided by a viewer indicating an interest in becoming an audience measurement panelist. If so, control advances to block 1020 where the example analyzer 404 flags the audience measurement data included in the report for association with a potential panelist. Otherwise, control advances to block 1008 where the example analyzer 404 determines whether enrollment of a viewer associated with the audience measurement module 116 as a panelist is expected. In some examples, enrollment of a view as a panelist may be expected where a particular report does not include such an indication because a previously collected report included an indication of interest by the viewer. If the enrollment of the viewer as a panelist is expected (block 1008), control again advances to block 1020 to flag the audience measurement data included in the report for association with the potential (e.g., expected) panelist.

The audience measurement data is flagged for a potential or expected panelist after blocks 1006 and 1008 to account for delays between when the indication of interest is received from the viewer and when the viewer completes the enrollment process to become a panelist. For instances, in some examples, an audience measurement module 116 may receive a user response indicating a viewer has an intent (or at least an interest) in becoming a panelist, whereupon the audience measurement module 116 may provide a redirecting barcode 122 for the viewer to scan to access a website to learn more and/or complete the process to enroll as a panelist. However, there is no way for the audience measurement module 116 to directly confirm whether the viewer actually scans the barcode 122 or proceeds to complete the enrollment process because these actions are accomplished via a separate portable device 118. Furthermore, the enrollment process is not instantaneous but involves the viewer taking time to provide the relevant information to become a panelist (e.g., by filling out an online form). Further still, the viewer may delay completing the enrollment process to some future point in time. By flagging the audience measurement data collected as of the time an indication of interest in becoming a panelist is received enables such data to be associated with the viewer when and if the viewer does in fact, complete the enrollment process.

Thus, after flagging the audience measurement data (block 1020), control advances to block 1022 where the example analyzer 404 determines whether panelist enrollment information has been received via a website designated by the barcode 122. If so, control advances to block 1024 where the example analyzer 404 associates the flagged audience measurement data with the panelist. Thereafter, control advances to block 1026 where the example request coordinator 406 sends instructions to the audience measurement module 116 to stop subsequent requests to enroll as a panelist. Control then advances to blocks 1028 and 1030 to aggregates the audience measurement data and generate report(s) as described above.

If the example analyzer 404 determines that panelist enrollment information has not been received (block 1022), control advances to block 1010 where the example analyzer 404 determines whether a threshold period of time has elapsed. In some examples, the threshold period of time corresponds to a duration of time in which it is expected that a viewer will complete the enrollment process to become a panelist after providing an indication of interest in doing so. The threshold period of time may account for the time it takes to complete the enrollment process (e.g., fill out the online form) as well as any potential delay before the viewer takes the time to complete the process. The threshold period of time may be any suitable time period (e.g., one hour, several hours, one day, three days, one week, etc.). If no enrollment information is received within the threshold period of time, it may be assumed that the viewer either did not scan the barcode 122 or decided not to go through with the enrollment process. Thus, if the threshold period of time has not elapsed (block 1010), control returns to block 1002, to continue repeating the process based on additional reports from the audience measurement module 116 and flagging the collected audience measurement data (block 1020) until enrollment information is received (block 1022) or the threshold period elapses (block 1010).

If the threshold period of time has elapsed (block 1010), control advances to block 1012, where the example analyzer 404 removes the flag associated with the audience measurement data before control advances to block 1014. Returning to block 1008, if the example analyzer 404 determines that enrollment of a viewer as a panelist is not expected (e.g., no indication of interest has been received), control advances directly to block 1014. At block 1014, the example analyzer 404 aggregates the audience measurement data with data from other non-panelists. Thereafter, control advances to block 1016 where the example analyzer 404 generates report(s) of audience metrics based on the aggregated data. The example process of FIG. 10 then ends.

Figure 11:
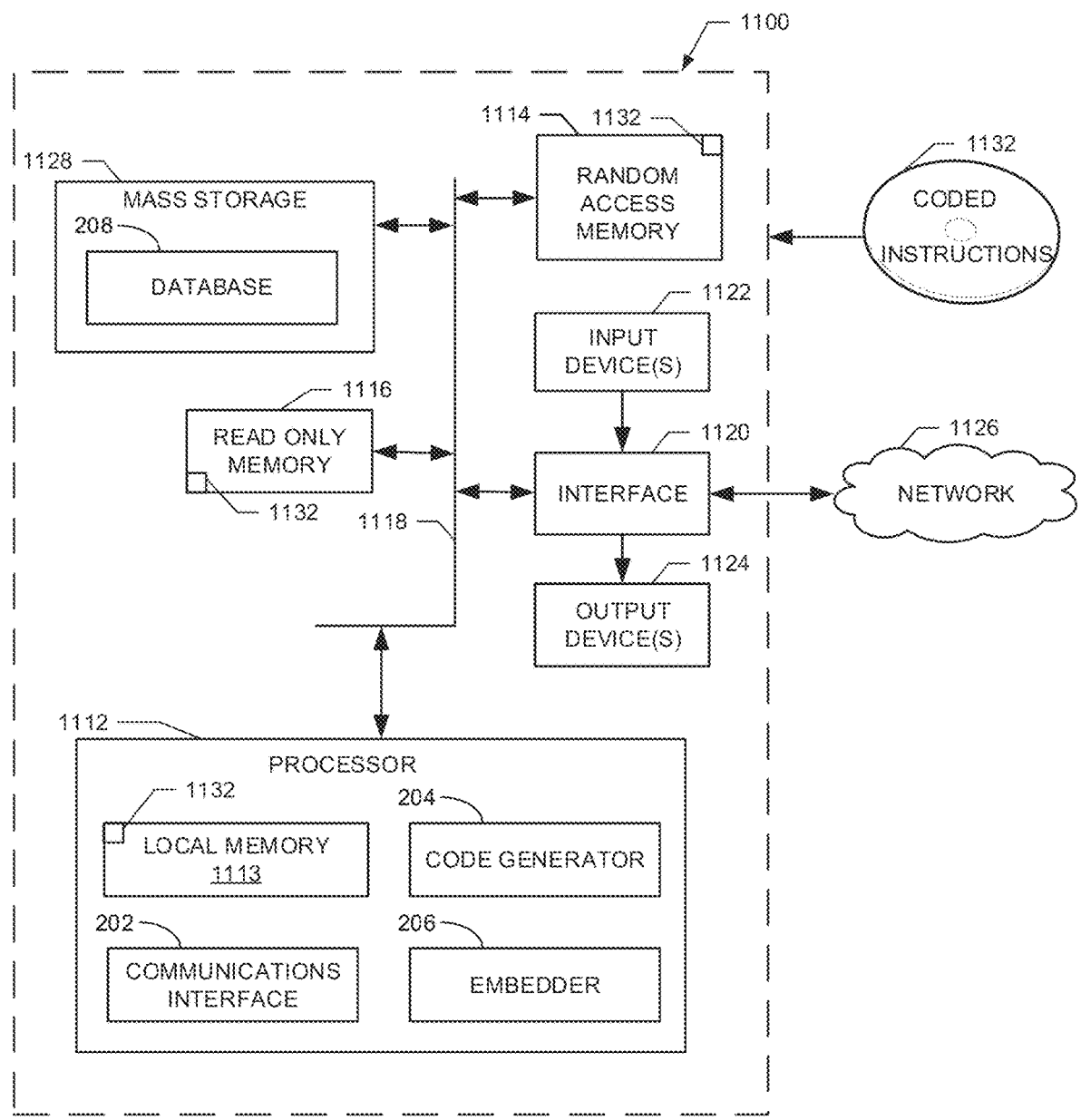
FIG. 11 is a block diagram of an example processor platform capable of executing the example machine-readable instructions of FIG. 5 to implement the example media encoder of FIGS. 1 and/or 2.

FIG. 11 is a block diagram of an example processor platform 1100 capable of executing the example machine-readable instructions of FIG. 5 to implement the example media encoder 108 of FIGS. 1 and/or 2. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example, the processor 1112 implements the example communications interface 202, the example code generator 204, and the example embedder 206 of the example media encoder 108 of FIG. 2.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives. In some examples, the mass storage devices 1128 implements the example database 208 of the example media encoder 108 of FIG. 2.

The coded instructions 1132 of FIG. 5 may be stored in the mass storage device 1128, in the volatile memory 1114, in the non-volatile memory 1116, and/or on a removable tangible computer readable storage medium such as a CD or DVD.

Figure 12:
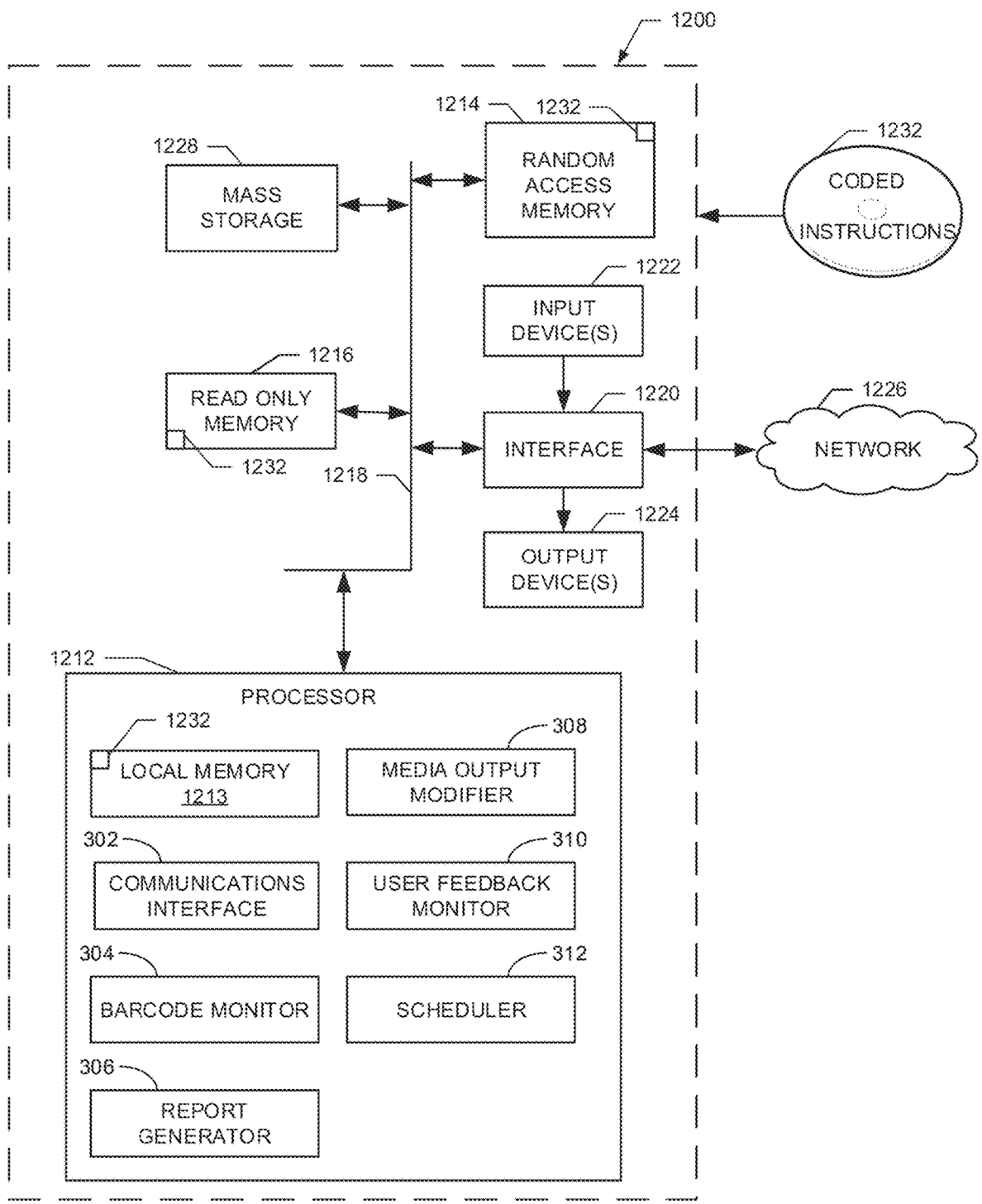
FIG. 12 is a block diagram of an example processor platform capable of executing the example machine-readable instructions of FIGS. 6, 7, and/or 8 to implement the example audience measurement module of FIGS. 1 and/or 3.

FIG. 12 is a block diagram of an example processor platform 1200 capable of executing the example machine-readable instructions of FIGS. 6-8 to implement the example audience measurement module of FIGS. 1 and/or 3. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. In the illustrated example, the processor 1212 implements the example communications interface 302, the example analyzer 304, the example report generator 306, the example media output modifier 308, the example user feedback monitor 310, the example scheduler 312, and the example media sampler 313, of the example audience measurement module 116 of FIG. 3.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 6-8 may be stored in the mass storage device 1228, in the volatile memory 1214, in the non-volatile memory 1216, and/or on a removable tangible computer readable storage medium such as a CD or DVD.

Figure 13:
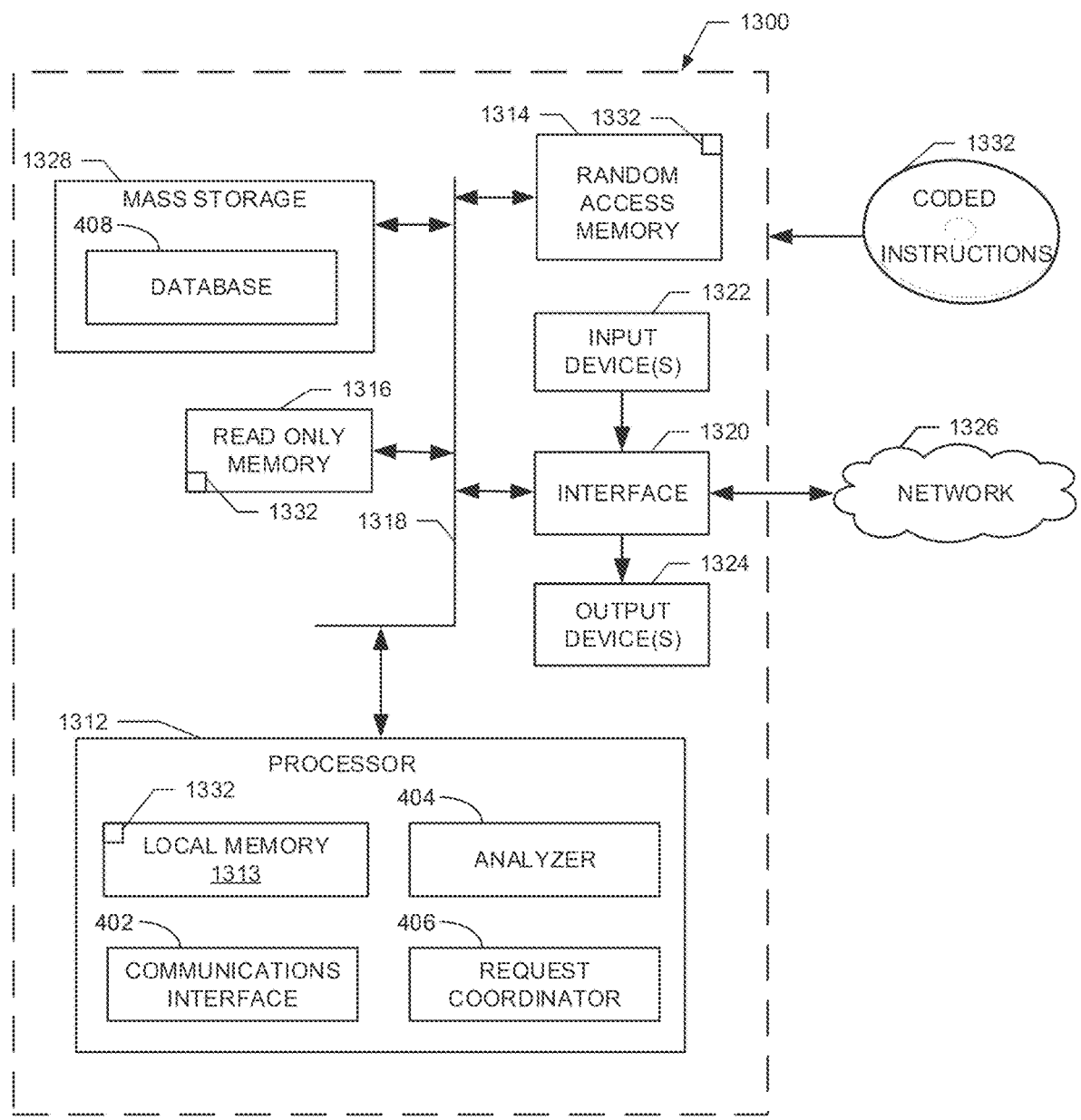
FIG. 13 is a block diagram of an example processor platform capable of executing the example machine-readable instructions of FIGS. 9 and/or 10 to implement the example audience measurement entity of FIGS. 1 and/or 4.

FIG. 13 is a block diagram of an example processor platform 1300 capable of executing the example machine-readable instructions of FIGS. 9 and/or 10 to implement the example central facility 110 of FIGS. 1 and/or 4. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In the illustrated example, the processor 1312 implements the example communications interface 402, the example analyzer 404, and the example request coordinator 406 of the example central facility of FIG. 4.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. In the illustrated example, the mass storage devices 1328 implements the example database 408 of the example central facility of FIG. 4.

The coded instructions 1332 of FIGS. 9 and 10 may be stored in the mass storage device 1328, in the volatile memory 1314, in the non-volatile memory 1316, and/or on a removable tangible computer readable storage medium such as a CD or DVD.

From the foregoing, it will be appreciated that methods, apparatus and articles of manufacture disclosed herein enable the collection of audience measurement data from potentially very large populations through reports received from audience measurement modules that may be incorporated into media devices of audience members regardless of whether they are part of an audience measurement panel. In some example, the audience measurement modules are incorporated into the media device (e.g., consumer electronic device) during manufacturing (e.g., prior to purchase by a consumer). While the collection of audience measurement data often involves the use of specialized equipment provided to panelists, teachings disclosed herein enable census-wide tracking of media exposure by embedded visual-based codes (e.g., barcodes) into media distributed to media devices containing an audience measurement module (which may be hardware and/or software dedicated to audience measurement). Such codes can be detected, decoded, and/or reported to a central facility of an audience measurement entity using relatively little processing power of the media device. Furthermore, examples disclosed herein enable the census-type delivery of requests to audience members to provide additional audience measurement data such as people counts, demographic information, and/or other relevant details to expand upon the data collected from automatic reports of the detected codes embedded in the media. In some examples, the requests for additional audience measurement data include providing a redirecting barcode for display on the screen presenting the media for viewers to scan with a separate portable device. Upon scanning the barcode, a browser of the portable device may be directed to a website through which the additional audience measurement data can be provided. In this manner, viewers of media may provide the requested data without being distracted with media on the primary screen presenting the media. In some examples, the requests for additional audience measurement data are provided in connection with a request for the audience members to become panelists of an audience measurement panel. The automatic delivery of such requests on a census-wide scale is a cost effective way to increase the likelihood of obtaining large numbers of individuals joining panels for more robust audience metrics.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A media device comprising:
   means for analyzing a video stream of media being presented by the media device, the means for analyzing to detect and decode a first code embedded in the video stream, the first code referencing first audience measurement data for identifying the media;
   means for modifying a media output, the means for modifying to: (i) provide a request to join an audience measurement panel, the request to be provided in response to detection of the first code, and (ii) provide a second code for display in response to detection of the first code, the second code including information that, when the second code is scanned with a portable device other than the media device, is to direct the portable device to a website to provide additional audience measurement data, wherein the website facilitates enrollment of an audience member in the audience measurement panel; and
   means for receiving a user response to the request to join the audience measurement panel prior to the second code being provided for display, the user response indicating the audience member has an interest in joining the audience measurement panel.

2. The media device of claim 1, wherein the additional audience measurement data includes at least one of a count of people exposed to the media or demographic information corresponding to the people exposed to the media.

3. The media device of claim 1, wherein the request to join the audience measurement panel includes a text prompt displayed by the media device.

4. The media device of claim 1, wherein the first code is embedded in a video frame by a provider of the media.

5. The media device of claim 4, wherein the first code is not embedded in a first adjacent video frame immediately before the video frame containing the first code or in a second adjacent video frame immediately after the video frame containing the first code.

6. The media device of claim 1, wherein the first code is one of a linear barcode or a two-dimensional barcode.

7. The media device of claim 1, wherein the first audience measurement data referenced by the first code includes at least one of a source of the media or a timestamp corresponding to when the media was transmitted for distribution by a provider of the media.

8. The media device of claim 1, wherein the second code is one of a linear barcode or a two-dimensional barcode.

9. The media device of claim 1, wherein the second code is a duplication of the first code.

10. The media device of claim 1, wherein the second code includes a uniform resource locator corresponding to the website, the website to include a form to complete an enrollment process for becoming a panelist of the audience measurement panel.

11. The media device of claim 1, further including means for scheduling, the means for scheduling to suppress display of the second code for a threshold period of time after an initial display of the second code.

12. The media device of claim 11, wherein the threshold period of time is defined by input received from an audience measurement entity.

13. The media device of claim 1, further including means for transmitting a report to a central facility in response to the means for analyzing detecting the first code.

14. The media device of claim 13, wherein the report includes at least one of the first code or the first audience measurement data referenced by the first code.

15. The media device of claim 13, wherein the report includes device identifying information to identify the media device.

16. The media device of claim 13, further including means for sampling a segment of the media, the report to include the segment of the media for comparison to reference media signatures.

17. The media device of claim 16, wherein the means for sampling is to sample the segment when the means for analyzing does not detect the first code.

18. A media device comprising:
means for analyzing a video stream of media being presented by the media device, the means for analyzing to detect a first code embedded in the video stream, the first code referencing first audience measurement data to identify the media; and
means for modifying a media output, the means for modifying to:
after detection of the first code, provide a request for an audience member to join an audience measurement panel; and
after receipt of a response to the request, cause the media device to present a second code, the second code including information that, when the second code is scanned with a portable device other than the media device, is to direct the portable device to a website to provide additional audience measurement data.

19. The media device of claim 18, wherein the first code is a first instance of the first code detected at a first point in time, the request is a first instance of the request, the means for analyzing is to detect a second instance of the first code at a second point in time after the first point in time, the media device further includes means for suppressing provision of a second instance of the request in response to detection of the second instance of the first code when less than a threshold period of time has elapsed since the first instance of the request was provided, and the means for modifying is to provide the second instance of the request in response to the detection of the second instance of the first code after the threshold period of time has elapsed since the first instance of the request was provided.

20. The media device of claim 19, wherein the threshold period of time is defined by input received from an audience measurement entity.

21. The media device of claim 19, further including means for transmitting reports to a central facility, the means for transmitting to:
transmit a first report to the central facility in response to the first instance of the first code; and
transmit a second report to the central facility in response to the second instance of the first code regardless of whether the threshold period of time has elapsed, the first report and the second report including at least one of the first code or the first audience measurement data referenced by the first code.

22. The media device of claim 18, wherein the second code includes a uniform resource locator corresponding to the website, the website to include a form associated with an enrollment process to become a panelist of the audience measurement panel.

23. An apparatus comprising:
means for storing audience measurement data associated with an audience member; and
means for analyzing the audience measurement data, the means for analyzing to:
assign a flag to the audience measurement data when panel enrollment information for the audience member is not stored in the means for storing; and
when the panel enrollment information is obtained within a threshold period of time after the flag is assigned, associate the audience measurement data with the audience member.

24. The apparatus as defined in claim 23, further including means for receiving a report from a media device, the report including the audience measurement data and a user response indicating interest by the audience member to be enrolled in an audience measurement panel.

25. The apparatus as defined in claim 24, wherein the report is a first report, the audience measurement data is first audience measurement data, the means for receiving is to receive a second report from the media device, the second report including second audience measurement data, the second report not including the user response, and the means for analyzing is to (1) assign a second flag to the second audience measurement data when the panel enrollment information is not stored in the means for storing and the threshold period of time has not elapsed, and (2) associate the second audience measurement data with the audience member when the panel enrollment information is obtained within the threshold period of time.

26. The apparatus as defined in claim 24, wherein the user response is obtained by the media device in response to an enrollment request presented by the media device, and further including means for sending an instruction to the media device to stop presentation of subsequent enrollment requests after the panel enrollment information is received.

27. The apparatus as defined in claim 24, wherein the report is a first report, the audience measurement data is first audience measurement data, the means for receiving is to receive a second report from the media device after the panel enrollment information is received, the second report including second audience measurement data, and the means for analyzing to associate the second audience measurement data with the audience member.

28. The apparatus as defined in claim 27, wherein the means for analyzing is further to aggregate the second audience measurement data with other audience measurement data associated with other audience members who are panelists in the audience measurement panel.

29. The apparatus as defined in claim 23, wherein, when the panel enrollment information is not obtained within the threshold period of time after the flag is assigned, the means for analyzing is to:

remove the flag assigned to the audience measurement data; and aggregate the audience measurement data with other audience measurement data associated with other audience members who are not panelists in an audience measurement panel.

* * * * *